(12) United States Patent
Teyeb et al.

(10) Patent No.: US 12,284,704 B2
(45) Date of Patent: Apr. 22, 2025

(54) HANDLING OF SPLIT RADIO BEARERS DURING MCG/SCG FAILURE RECOVERY

(71) Applicant: Telefonaktiebolaget LM Ericsson (publ), Stockholm (SE)

(72) Inventors: Oumer Teyeb, Montréal (CA); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 17/907,782

(22) PCT Filed: Feb. 16, 2021

(86) PCT No.: PCT/SE2021/050130
§ 371 (c)(1),
(2) Date: Aug. 29, 2022

(87) PCT Pub. No.: WO2021/194404
PCT Pub. Date: Sep. 30, 2021

(65) Prior Publication Data
US 2023/0127850 A1    Apr. 27, 2023

Related U.S. Application Data

(60) Provisional application No. 62/994,059, filed on Mar. 24, 2020.

(51) Int. Cl.
*H04W 76/15* (2018.01)
*H04W 36/00* (2009.01)
(Continued)

(52) U.S. Cl.
CPC ....... *H04W 76/15* (2018.02); *H04W 36/0016* (2013.01); *H04W 36/0069* (2018.08);
(Continued)

(58) Field of Classification Search
CPC ............. H04W 76/15; H04W 36/0016; H04W 36/0069; H04W 36/00698; H04W 36/305;
(Continued)

(56) References Cited

U.S. PATENT DOCUMENTS

2019/0261208 A1* 8/2019 Lee ................ H04W 72/21
2022/0167445 A1* 5/2022 Wang ............. H04L 1/0025
2022/0225461 A1* 7/2022 Zhang ............ H04W 76/15

OTHER PUBLICATIONS

"3GPP TS 23.501 V15.8.0", 3rd Generation Partnership Project; Technical Specification Group Services and System Aspects; System architecture for the 5G System (5GS); Stage 2 (Release 15), Dec. 2019, pp. 1-248.
(Continued)

*Primary Examiner* — Dady Chery
(74) *Attorney, Agent, or Firm* — Murphy, Bilak & Homiller, PLLC

(57) ABSTRACT

Embodiments include methods by a user equipment (UE) configured for dual connectivity with a master node providing a master cell group that includes a primary serving cell (PCell) and with a secondary node providing a secondary cell group that includes a primary secondary cell (PSCell). Such methods include detecting a radio link problem associated with a first serving cell, wherein first serving cell is the PCell or the PSCell. Such methods include, in response to detecting the radio link problem, for each of the UE's split radio bearers that has a primary path set to a first cell group that includes the first serving cell, performing a recovery procedure such that all uplink data transmission for the split radio bearer occurs only via a secondary path that does not include the first serving cell. Embodiments also include complementary methods performed by network nodes, as well as UEs and network nodes.

21 Claims, 14 Drawing Sheets

(51) Int. Cl.
    *H04W 36/30*      (2009.01)
    *H04W 76/19*      (2018.01)
(52) U.S. Cl.
    CPC ... *H04W 36/00698* (2023.05); *H04W 36/305* (2018.08); *H04W 76/19* (2018.02); *H04W 36/00695* (2023.05)
(58) Field of Classification Search
    CPC .......... H04W 76/19; H04W 36/00695; H04W 36/0079
    See application file for complete search history.

(56) References Cited

OTHER PUBLICATIONS

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.

"3GPP TS 36.321 V15.8.0", 3rd Generation Partnership Project; Technical Specification Group Radio Access Network; Evolved Universal Terrestrial Radio Access (E-UTRA); Medium Access Control (MAC) protocol specification (Release 15), Dec. 2019, pp. 1-134.

"3GPP TS 36.323 V15.5.0", 3rd Generation Partnership Project; Technical Specification Group Radio Access Network; Evolved Universal Terrestrial Radio Access (E-UTRA); Packet Data Convergence Protocol (PDCP) specification (Release 15), Dec. 2019, pp. 1-52.

"3GPP TS 37.340 V16.0.0", 3rd Generation Partnership Project; Technical Specification Group Radio Access Network; Evolved Universal Terrestrial Radio Access (E-UTRA) and NR; Multi-connectivity; Stage 2 (Release 16), Dec. 2019, pp. 1-72.

"3GPP TS 38.133 V16.2.0", 3rd Generation Partnership Project; Technical Specification Group Radio Access Network; NR; Requirements for support of radio resource management (Release 16), Dec. 2019, pp. 1-1129.

"CR for 38.331 for CA&DC enh", 3GPP TSG-RAN WG2 Meeting #109-e, R2-2002392, Electronic meeting, Feb. 24-Mar. 6, 2020, pp. 1-112.

"Discussion on MCG failure recovery", 3GPP TSG-RAN WG2 Meeting #106, R2-1908050, Reno, USA, May 13-17, 2019, pp. 1-3.

"Introduction of CA/DC enhancements to 37.340", 3GPP TSG-RAN2 Meeting #109-e, R2-2002395, Electronic meeting, Feb. 24-Mar. 6, 2020, pp. 1-16.

"SCG failure handling for split bearer", 3GPP TSG-RAN WG2 Meeting #103bis, R2-1815058, Resubmission of R2-1811291, Chengdu, China, Oct. 8-12, 2018, pp. 1-3.

"3GPP TS 38.300 V16.0.0", 3rd Generation Partnership Project; Technical Specification Group Radio Access Network; NR; NR and NG-RAN Overall Description; Stage 2 (Release 16), Dec. 2019, pp. 1-101.

"3GPP TS 38.323 V15.6.0", 3rd Generation Partnership Project; Technical Specification Group Radio Access Network; NR; Packet Data Convergence Protocol (PDCP) specification (Release 15), Jun. 2019, pp. 1-26.

"3GPP TS 36.331 V15.8.0", 3rd Generation Partnership Project; Technical Specification Group Radio Access Network; Evolved Universal Terrestrial Radio Access (E-UTRA); Radio Resource Control (RRC); Protocol specification (Release 15), Dec. 2019, pp. 1-317.

"3GPP TS 38.321 V15.8.0", 3rd Generation Partnership Project; Technical Specification Group Radio Access Network; NR; Medium Access Control (MAC) protocol specification (Release 15), Dec. 2019, pp. 1-78.

"3GPP TS 38.331 V15.8.0", 3rd Generation Partnership Project; Technical Specification Group Radio Access Network; NR; Radio Resource Control (RRC) protocol specification (Release 15), Dec. 2019, pp. 1-532.

"3GPP TS 38.304 V15.5.0", 3rd Generation Partnership Project; Technical Specification Group Radio Access Network; NR; User Equipment (UE) procedures in Idle mode and RRC Inactive state (Release 15), Sep. 2019, pp. 1-29.

"3GPP TS 33.401 V15.10.0", 3rd Generation Partnership Project; Technical Specification Group Services and System Aspects; 3GPP System Architecture Evolution (SAE); Security architecture (Release 15), Dec. 2019, pp. 1-163.

"3GPP TR 38.804 V1.0.0", 3rd Generation Partnership Project; Technical Specification Group Radio Access Network; Study on New Radio Access Technology; Radio Interface Protocol Aspects (Release 14), Mar. 2017, pp. 1-56.

* cited by examiner

HANDLING OF SPLIT RADIO BEARERS DURING MCG/SCG FAILURE RECOVERY

TECHNICAL FIELD

The present application relates generally to the field of wireless communications, and more specifically to devices, methods, and computer-readable media that improve operation of user equipment (UEs, e.g., wireless devices) configured in dual connectivity via multiple serving cells provided by different network nodes in a wireless network.

BACKGROUND

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. While the present disclosure relates primarily to 5G/NR, the following description of fourth-generation Long-Term Evolution (LTE) technology is provided to introduce various terms, concepts, architectures, etc. that are also used in 5G/NR.

LTE is an umbrella term that refers to radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective Sha interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a LE in RRC_IDLE state is known in the EPC and has an assigned IP address.

Furthermore, in RRC_IDLE state, the UE's radio is active on a discontinuous reception (DRX) schedule configured by upper layers, During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink (DL), and on Single-Carrier Frequency Division Multiple Access (SC-FDMA) with a cyclic prefix in the uplink (UL). To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 0.5-ms slots. A 1-ms subframe includes two consecutive slots, each of which includes $N^{DL}_{symb}$ OFDM symbols comprised of $N_{sc}$ OFDM subcarriers. Similarly, each UL slot consists of $N^{UL}_{symb}$ OFDM symbols, each of which includes $N_{sc}$ OFDM subcarriers. A combination of a particular subcarrier in a particular symbol is known as a resource element (RE).

The LTE PHY maps various DL and UL physical channels to the resources described above. In general, a physical channel corresponds to a set of REs carrying information that originates from higher layers. DL channels include physical DL control channel (PDCCH) and physical DL shared channel (PDSCH), while UL channels include PUCCH and PUSCH. Certain REs within each LTE subframe are also reserved for DL and UL transmission of reference signals.

3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, master node (MN), anchor node, and MeNB can be used interchangeably, and the terms secondary node (SN), booster node, and SeNB can be used interchangeably. DC can be viewed as a special case of CA, in which the aggregated carriers (or cells) are provided by network nodes that are physically separated and not connected via a robust, high-capacity connection.

More specifically, in DC, the UE is configured with a Master Cell Group (MCG) and a Secondary Cell Group (SCG). A Cell Group (CG) is a group of serving cells associated with either the MeNB or the SeNB(s) and includes one MAC entity, a set of logical channels with associated RLC entities, a primary cell, and optionally one or more secondary cells. The Master Cell Group (MCG) is a group of serving cells associated with the MeNB and includes a primary cell (PCell) and optionally one or more secondary cells (SCells). A Secondary Cell Group (SCG) is a group of serving cells associated with the SeNB and includes a Primary SCell (PSCell) and optionally one or more SCells. The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. For example, the MN terminates the connection between the eNB and the Mobility Management Entity (MME) for the UE. An SN provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

Both MN and SN can terminate the user plane (UP) to the UE, which includes three different types of bearers. MCG bearers are terminated in the MN, and the S1-U connection for the corresponding bearer(s) to the S-GW is terminated in the MN. The SN is not involved in the transport of UP data for MCG bearers. Likewise, SCG bearers are terminated in the SN, which can be directly connected with the S-GW via S1-U. The MN is not involved in the transport of UP data for SCG bearers. An S1-U connection between S-GW and SN is only present if SCG bearers are configured. Finally, split bearers are also terminated in the MN, with PDCP data being transferred between MN and SN via X2-U. Both SN and MN are involved in transmitting data for split bearers.

The network's RRC connection with the UE is handled only by the MN and, accordingly, SRBs (Signaling Radio Bearers) are always configured as MCG bearer type and only use MN radio resources. However, the MN can also configure the UE based on input from the SN and, in this manner, the SN can indirectly control the UE.

5G/NR technology shares many similarities with 4G/LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a downlink (DL) "beam" is a coverage area of a network-transmitted RS that may be measured or monitored by a UE.

DC is also envisioned as a important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

In some situations, a UE can lose coverage to a cell (e.g., in MCG or SCG) to which it is currently connected. This could occur when a UE enters a fading dip and/or when a handover to another cell failed for some reason. This can be particularly problematic if a "handover region" associated with a cell is very small.

A UE will monitor the quality of a radio link in a cell and, under certain conditions, declare a radio link failure (RLF). Conventionally, after declaring RLF, the UE tries to re-establish a connection in a different target cell (e.g., one with better signal conditions). However, this process can be time-consuming and cause service interruptions to the UE. As an alternative for RLF in MCG, LTE/NR Rel-16 introduced fast MCG link recovery. This is an RRC procedure whereby the UE sends an MCG Failure Information message to the MN via the SCG upon MCG RLF detection instead of triggering re-establishment. Even so, there are various problems, issues, and/or difficulties with this procedure in relation to split radio bearers that use resources from both MCG and SCG.

SUMMARY

Accordingly, exemplary embodiments of the present disclosure address these and other problems, issues, and/or difficulties in relation to split radio bearers that use resources from both master cell group (MCG) and secondary cell group (SCG) for UEs configured in dual connectivity (DC) by providing improvements that prevent unnecessary data transmission interruptions are prevented during failure recovery and allow transmission and/or reception of user-plane data to continue without interruption, e.g., during radio link problems in either the MCG or the SCG.

Embodiments include methods (e.g., procedures) performed by a user equipment (UE) configured for dual connectivity (DC) with a master node (MN) providing a master cell group (MCG) that includes a primary serving cell (PCell), and with a secondary node (SN) providing a secondary cell group (SCG) that includes a primary secondary cell (PSCell).

These exemplary methods can include detecting a radio link problem associated with a first serving cell, which is the UE's PCell or PSCell. In various embodiments, the radio link problem can be any one of the following: a radio link failure (RLF) associated with the PCell; a physical layer (PHY) problem associated with the PCell; a radio link failure (RLF) associated with the PSCell; or a physical layer (PHY) problem associated with the PSCell.

These exemplary methods can also include, in response to detecting the radio link problem, and for each of one or more of the UE's split radio bearers that has a primary path set to a first cell group including the first serving cell, performing a recovery procedure such that all uplink (UL) data transmission for the split radio bearer occurs only via a secondary path that does not include the first serving cell.

In some embodiments, these exemplary methods can also include receiving, from the MN, an indication of whether the UE should perform the recovery procedure in response to detecting the radio link problem. In such embodiments, the recovery procedure can be performed selectively based on the indication.

In some embodiments, these exemplary methods can also include sending, to a network node (e.g., MN or SN), an indication of the radio link problem associated with the first serving cell. For example, the indication can be sent in an MCG failure information message or an SCG failure information message.

In some embodiments, these exemplary methods can also include, for each of the UE's split radio bearers that was subject to the recovery procedure, performing a restoration procedure such that UL data transmission for the split radio bearer occurs via both the primary path and the secondary path. In various embodiments, performing the restoration procedure can be in response to the UE detecting that the radio link problem associated with the first serving cell has ended or the UE receiving a reconfiguration message from a network node (e.g., from MN, SN, or a target node for UE handover).

In some embodiments, performing the recovery procedure can include setting the primary path to a second cell group that does not include the first serving cell. In such embodiments, performing the restoration procedure can include setting the primary path to the first cell group or to a further cell group (e.g., provided by a target node for UE handover).

In other embodiments, performing the recovery procedure can include storing a currently configured value for an UL data threshold parameter in a local variable, and setting the UL data threshold parameter to a value that requires the UE to request UL grants only from a second cell group that does not include the first serving cell. In such embodiments, performing the restoration procedure can include restoring the value stored in the local variable to the UL data threshold parameter.

Other embodiments include methods (e.g., procedures) performed by a network node configured in DC with a UE via an MCG that includes a PCell or via an SCG that includes a PSCell. These exemplary methods can be performed by a network node (e.g., base station, eNB, gNB, etc., or component thereof) that is the UE's MN or SN.

These exemplary methods can include receiving, from the UE, an indication of a radio link problem associated with a first serving cell, which is the UE's PCell or PSCell and is part of a first cell group provided by the network node. For example, if the first serving cell is the UE's PCell, then the network node is the UE's MN and the first cell group is the MCG. Likewise, if the first serving cell is the UE's PSCell, then the network node is the UE's SN and the first cell group is the SCG.

In various embodiments, the radio link problem can be any one of the following: a RLF associated with the PCell; a PHY problem associated with the PCell; a RLF associated with the PSCell; or a PHY problem associated with the PSCell.

These exemplary methods can also include, in response to receiving the indication, sending a handover preparation information message to a target network node. The handover preparation information message can include a first indication of a UE handover due to a radio link problem in the first cell group, and a second indication that the UE has performed a recovery procedure for one or more split radio bearers such that all uplink (UL) data transmission for the one or more split radio bearers occurs only via a secondary path that does not include the first serving cell.

In some embodiments, these exemplary methods can also include sending, to the UE, a third indication of whether the UE should perform the recovery procedure in response to detecting the radio link problem. In some embodiments, the third indication can include respective indications associated with respective split radio bearers.

In some embodiments, the second indication can indicate that, for each of the split radio bearers, the UE has set the primary path to a second cell group that does not include the first serving cell. In other embodiments, the second indication can indicate that, for each of the split radio bearers, the UE has stored a currently configured value for an UL data threshold parameter in a local variable, and set the UL data threshold parameter to a value that requires the UE to request UL grants only from a second cell group that does not include the first serving cell.

Other embodiments include methods (e.g., procedures) performed by a target network node for a UE configured in DC via an MCG that includes a PCell and an SCG that includes a PSCell. These exemplary methods can be performed by a network node (e.g., base station, eNB, gNB, etc., or component thereof) that is a handover target by the UE's MN or SN.

These exemplary methods can include receiving a handover preparation information message from a network node. For example, the handover preparation information message can include a first indication of a UE handover due to a radio link problem in a first cell group, provided by the network node, that includes a first serving cell that is the UE's PCell or PSCell.

The handover preparation message can also include a second indication that the UE has performed a recovery procedure for one or more split radio bearers such that all uplink (UL) data transmission for the one or more split radio bearers occurs only via a secondary path that does not include the first serving cell.

In various embodiments, the radio link problem can be any one of the following: a RLF associated with the PCell; a PHY problem associated with the PCell; a RLF associated with the PSCell; or a PHY problem associated with the PSCell.

These exemplary methods can also include, in response to the second indication, performing a restoration procedure for each of the split radio bearers that was subject to the recovery procedure. In some embodiments, these exemplary methods can also include, in response to the first indication, performing a handover of the UE from the first serving cell to a first target cell in a target cell group provide by the target network node. In such embodiments, performing the restoration procedure can include sending, to the UE, a reconfiguration message that indicates the UE should perform a restoration procedure such that UL data transmission for each of the split radio bearers occurs via both the secondary path and a primary path that includes the first target cell.

In some embodiments, the second indication can indicate that, for each of the split radio bearers, the UE has set the primary path to a second cell group that does not include the first serving cell. In such embodiments, the reconfiguration message can indicate that, for each of the split radio bearers, the UE should set the primary path to a first target cell group that includes the first target cell.

In other embodiments, the second indication can indicate that the UE has, for each of the split radio bearers, stored a currently configured value for an UL data threshold parameter in a local variable and set the UL data threshold parameter to a value that requires the UE to request UL grants only from a second cell group that does not include the first serving cell. In such embodiments, the reconfiguration message can indicate that, for each of the split radio bearers, the UE should restore the value stored in the local variable to the UL data threshold parameter.

Other embodiments include UEs (e.g., wireless devices, MTC devices, NB-IoT devices, modems, etc. or components thereof) and network nodes (e.g., base stations, gNBs, eNBs, etc. or components thereof) configured to perform operations corresponding to any of the exemplary methods described herein. Other exemplary embodiments include non-transitory, computer-readable media storing computer-executable instructions that, when executed by processing circuitry, configure such UEs or network nodes to perform operations corresponding to any of the exemplary methods described herein.

These and other objects, features and advantages of embodiments of the present disclosure will become apparent upon reading the following Detailed Description in view of the Drawings briefly described below.

DETAILED DESCRIPTION

Figure 2:
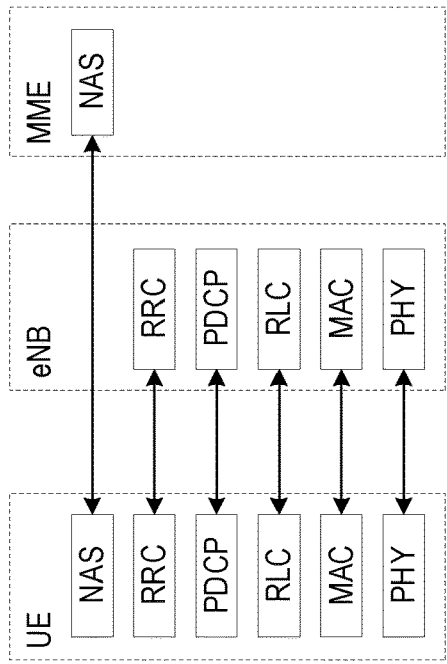
FIG. 2 is a block diagram of exemplary protocol layers of the control-plane (CP) portion of the radio (Uu) interface between a user equipment (UE) and the E-UTRAN.
Figure 3:
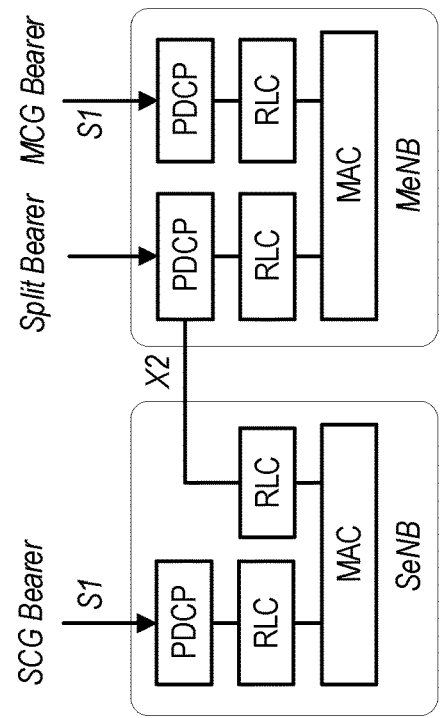
FIG. 3 illustrates a user plane (UP) protocol stack for LTE dual connectivity (DC).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As discussed above, after declaring radio link failure (RLF) in a cell, a UE tries to re-establish a connection in a different target cell (e.g., one with better signal conditions). However, this process can be time-consuming and cause service interruptions to the UE. As an alternative for RLF in MCG, LTE/NR Rel-16 introduced fast MCG link recovery. This is an RRC procedure whereby the UE sends an MCG Failure Information message to the MN via the SCG upon MCG RLF detection instead of triggering re-establishment. Even so, there are various problems, issues, and/or difficulties with this procedure in relation to split bearers that use resources from both MCG and SCG. These are discussed in more detail below.

Figure 4:
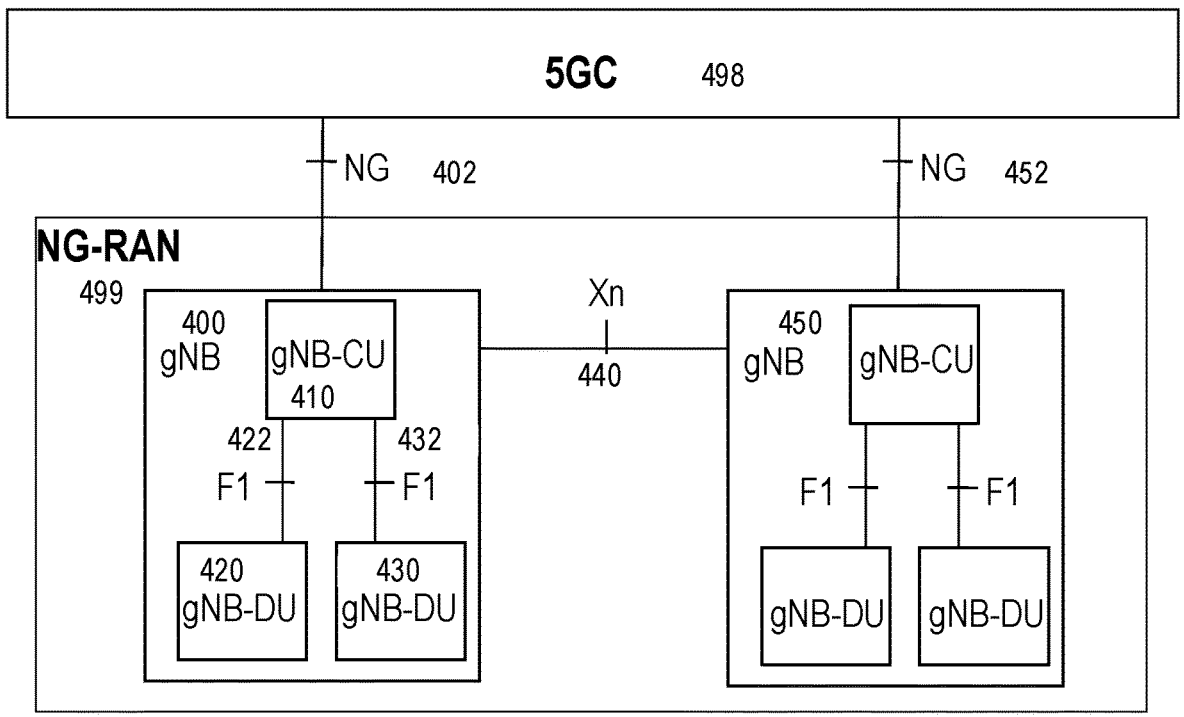
FIGS. 4-5 illustrate two high-level views of an exemplary 5G New Radio (NR) network architecture.

FIG. 4 illustrates a high-level view of an exemplary 5G network architecture, consisting of a Next Generation RAN (NG-RAN 499) and a 5G Core (5GC 498). NG-RAN 499 can include a set of gNodeB's (gNBs) connected to the 5GC via one or more NG interfaces, whereas the gNBs can be connected to each other via one or more Xn interfaces, such as Xn interface 440 between gNBs 400 and 450 in FIG. 4.

With respect the NR interface to UEs, each of the gNBs can support frequency division duplexing (FDD), time division duplexing (TDD), or a combination thereof.

NG-RAN 499 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F 1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for control plane (CP) and user plane (UP) data on TNL of NG-RAN interfaces is supported, NDS/IP (3GPP TS 33.401) shall be applied.

The NG RAN logical nodes shown in FIG. 4 include a central (or centralized) unit (CU or gNB-CU) and one or more distributed (or decentralized) units (DU or gNB-DU). For example, gNB 400 in FIG. 4 includes gNB-CU 410 and gNB-DUs 420 and 430. CUs (e.g., gNB-CU 410) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to its associated gNB-DUs over respective F1 logical interfaces, such as interfaces 422 and 432 shown in FIG. 4. The gNB-CU and connected gNB-DUs are only visible to other gNBs and the 5GC as a gNB, e.g., the F1 interface is not visible beyond gNB-CU. In the gNB split CU-DU architecture illustrated by FIG. 4, DC can be achieved by allowing a UE to connect to multiple DUs served by the same CU or by allowing a UE to connect to multiple DUs served by different CUs.

Figure 5:
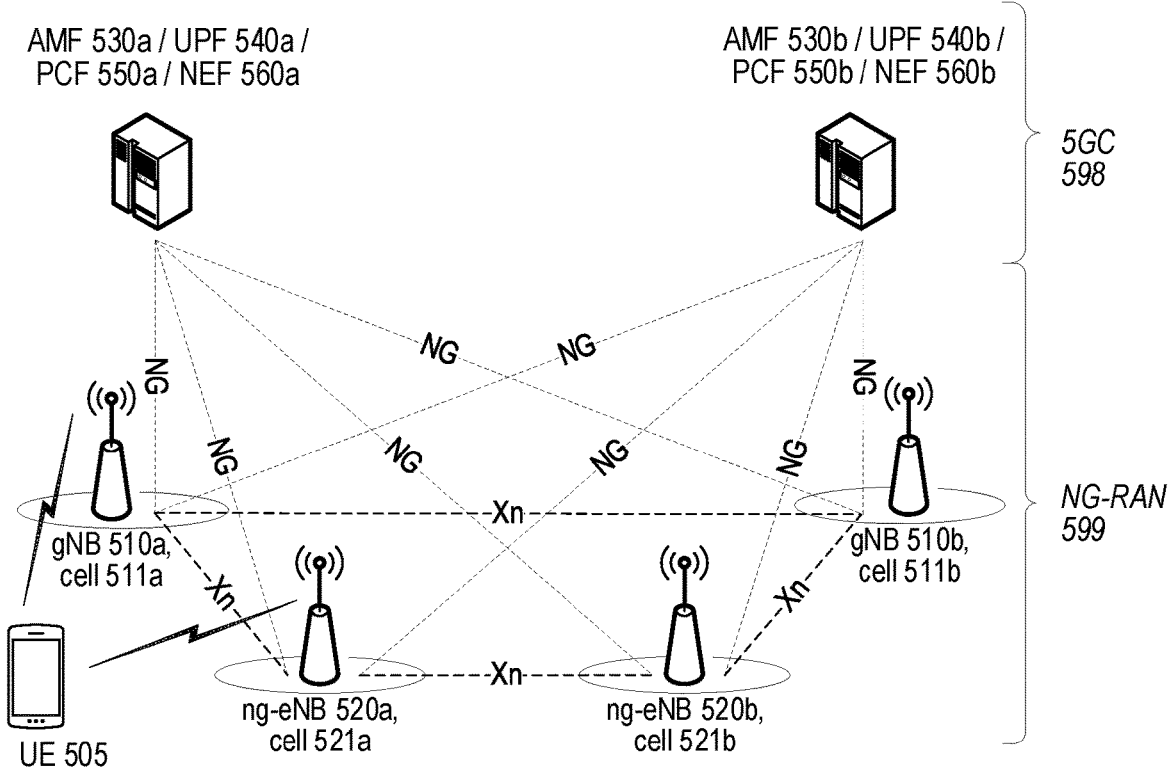

FIG. 5 shows another high-level view of an exemplary 5G network architecture, including an NG-RAN 599 and a 5GC 598. As shown in the figure, NG-RAN 599 can include gNBs 510 (e.g., 510a,b) and ng-eNBs 520 (e.g., 520a,b) that are interconnected with each other via respective Xn interfaces. The gNBs and ng-eNBs are also connected via the NG interfaces to 5GC 598, more specifically to the AMF (Access and Mobility Management Function) 530 (e.g., AMFs 530a, b) via respective NG-C interfaces and to the UPF (User Plane Function) 540 (e.g., UPFs 540a,b) via respective NG-U interfaces. Moreover, the AMFs 530a,b can communicate with one or more policy control functions (PCFs, e.g., PCFs 550a,b) and network exposure functions (NEFs, e.g., NEFs 560a,b).

Figure 1:
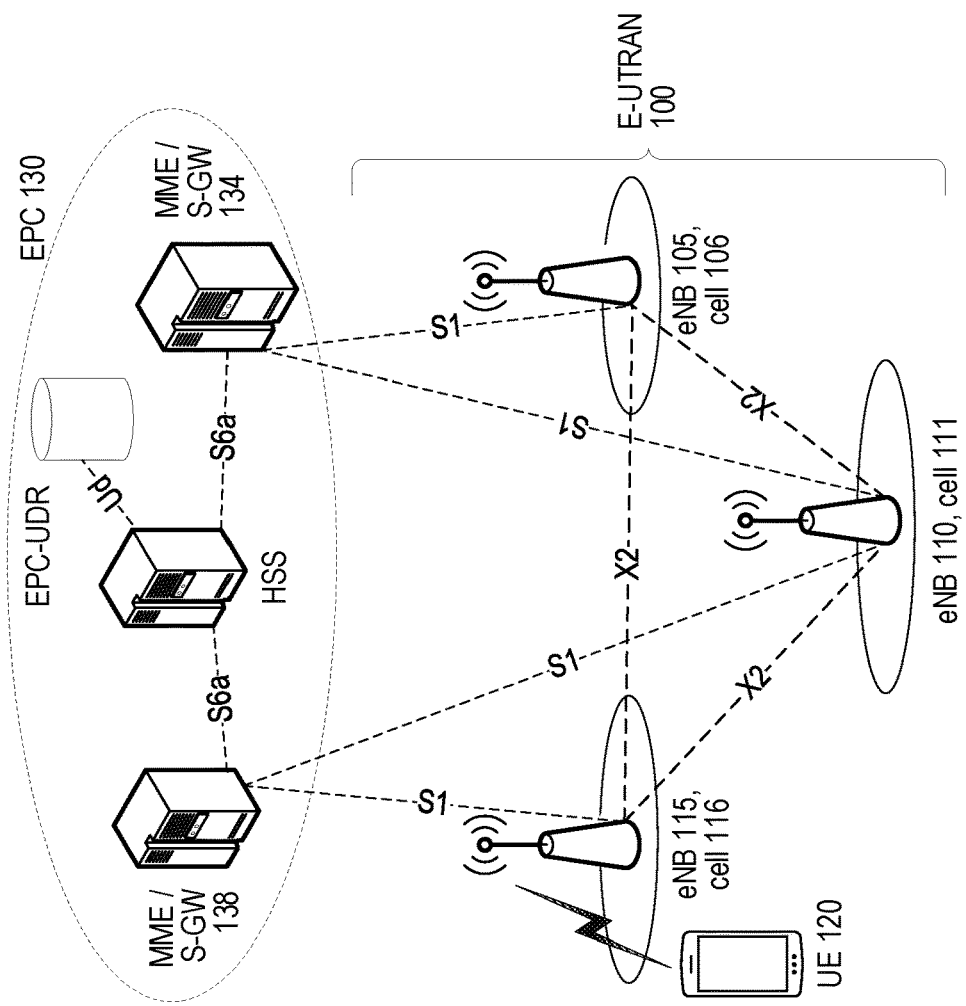
FIG. 1 is a high-level block diagram of an exemplary architecture of the Long-Term Evolution (LTE) Evolved UTRAN (E-UTRAN) and Evolved Packet Core (EPC) network, as standardized by 3GPP.

Each of the gNBs 510 can support the NR radio interface including frequency division duplexing (FDD), time division duplexing (TDD), or a combination thereof. In contrast, each of ng-eNBs 520 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 511a-b and 521a-b shown as exemplary in FIG. 5. In some embodiments, the gNBs and ng-eNBs can also use various directional beams to provide coverage in the respective cells. FIG. 5 further illustrates a UE 505 operating in dual-connectivity (DC) with gNB 510a and ng-eNB 520a via cells 511a and 521a, respectively.

3GPP TR 38.804 describes various exemplary dual-connectivity (DC) scenarios or configurations in which the MN and SN can apply either NR, LTE or both. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC;

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface. For example, UE 505 in FIG. 5 is operating in NE-DC.

NR-DC (or NR-NR DC): both MN and SN employ NR.

MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

Since deployment and/or migration for these options may differ for different operators, it is possible to have deployments with multiple options in parallel in the same network. In combination with LTE/NR DC solutions, it is also possible to support CA in each cell group (i.e., MCG and SCG) and DC between nodes on same RAT (e.g., NR-NR DC). For the NR cells, a consequence of these different deployments is the co-existence of NR cells supporting standalone (SA) only, non-standalone (NSA) only, or both SA and NSA. For the LTE cells, a consequence of these different deployments is the co-existence of LTE cells associated to eNBs connected to EPC, 5GC or both EPC and 5GC.

Figure 6:
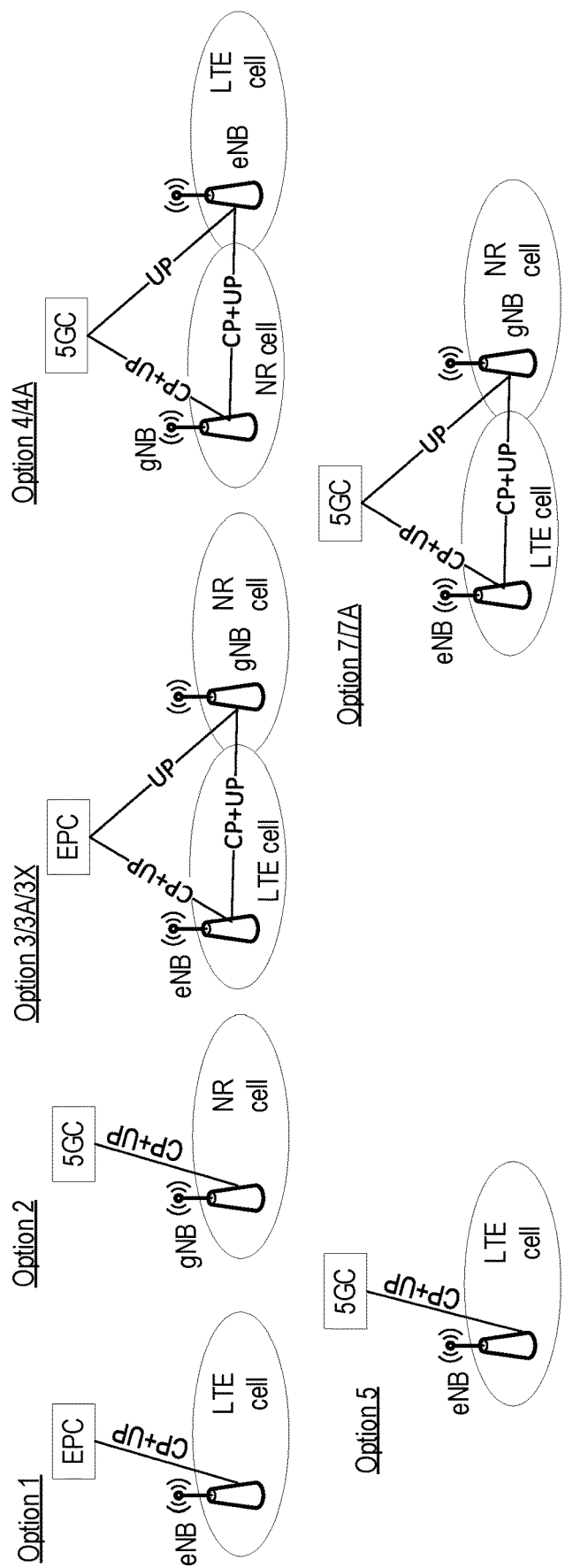
FIG. 6 illustrates various options for deploying a 5G network with or without interworking with existing LTE and EPC networks.

FIG. 6 illustrates various options for deploying a 5G network with or without interworking with existing LTE and EPC, according to current 3GPP standards. Option 1 depicts the legacy LTE standalone (SA) deployment where LTE eNBs are connected to an EPC. Option 2 depicts NR SA deployment where the NR gNBs are connected to a 5GC. Option 3/3A/3X depicts EN-DC, described above. Option 4/4A depicts NE-DC, described above. Option 5 shows a hybrid solution similar to FIG. 5, in which enhanced LTE eNBs (i.e., ng-eNBs) are connected to a 5GC. Option 7/7A depicts NGEN-DC, described above.

Since different network operators may use different migrations for these options, it is possible to have deployments with multiple options in parallel in the same network. For example, there could be eNBs supporting options 3, 5 and 7 in the same network as gNBs supporting options 2 and 4. It is also possible to support CA in each cell group (i.e., MCG and SCG) and DC between nodes on a single RAT (e.g., NR-NR DC). A consequence of these different deployments is the co-existence of LTE cells associated with eNBs connected to EPC, 5GC, or both EPC/5GC.

Figure 7:
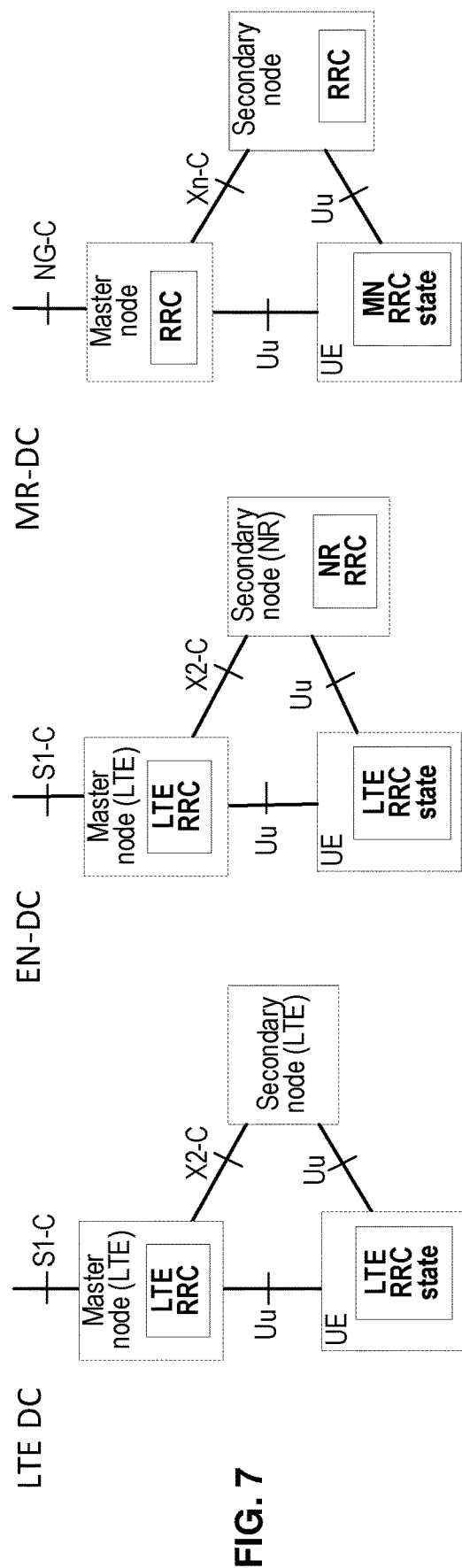
FIG. 7 is a block diagram showing a high-level comparison of control plane (CP) architectures for various DC configurations.
Figure 8:
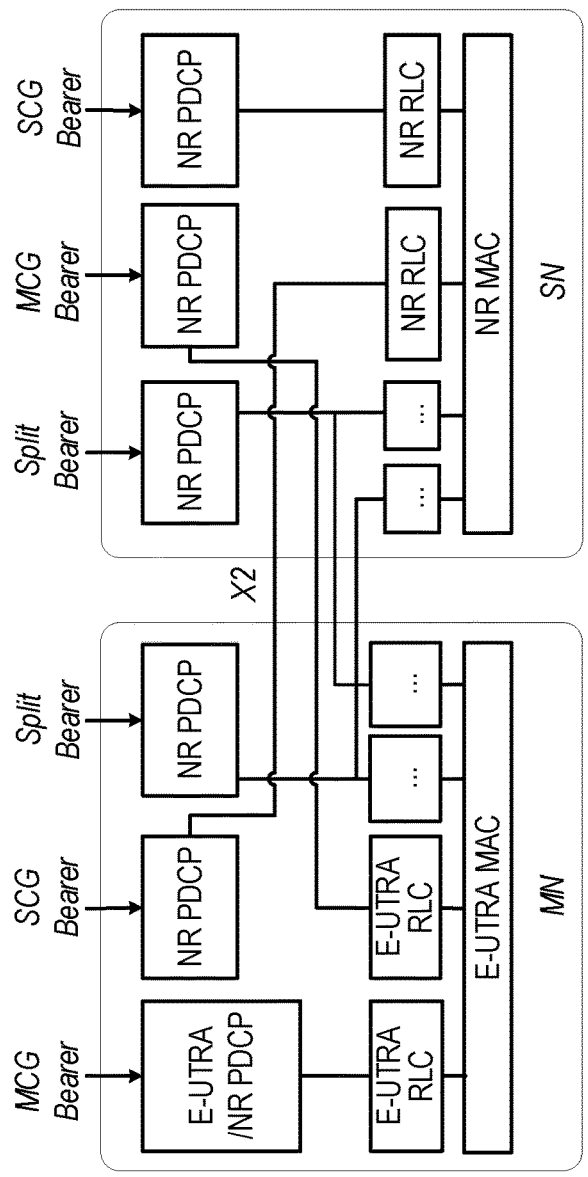
FIG. 8 illustrates network-side user plane (UP) protocol termination options for various radio bearers available in E-UTRAN/NR DC (EN-DC) configurations.
Figure 9:
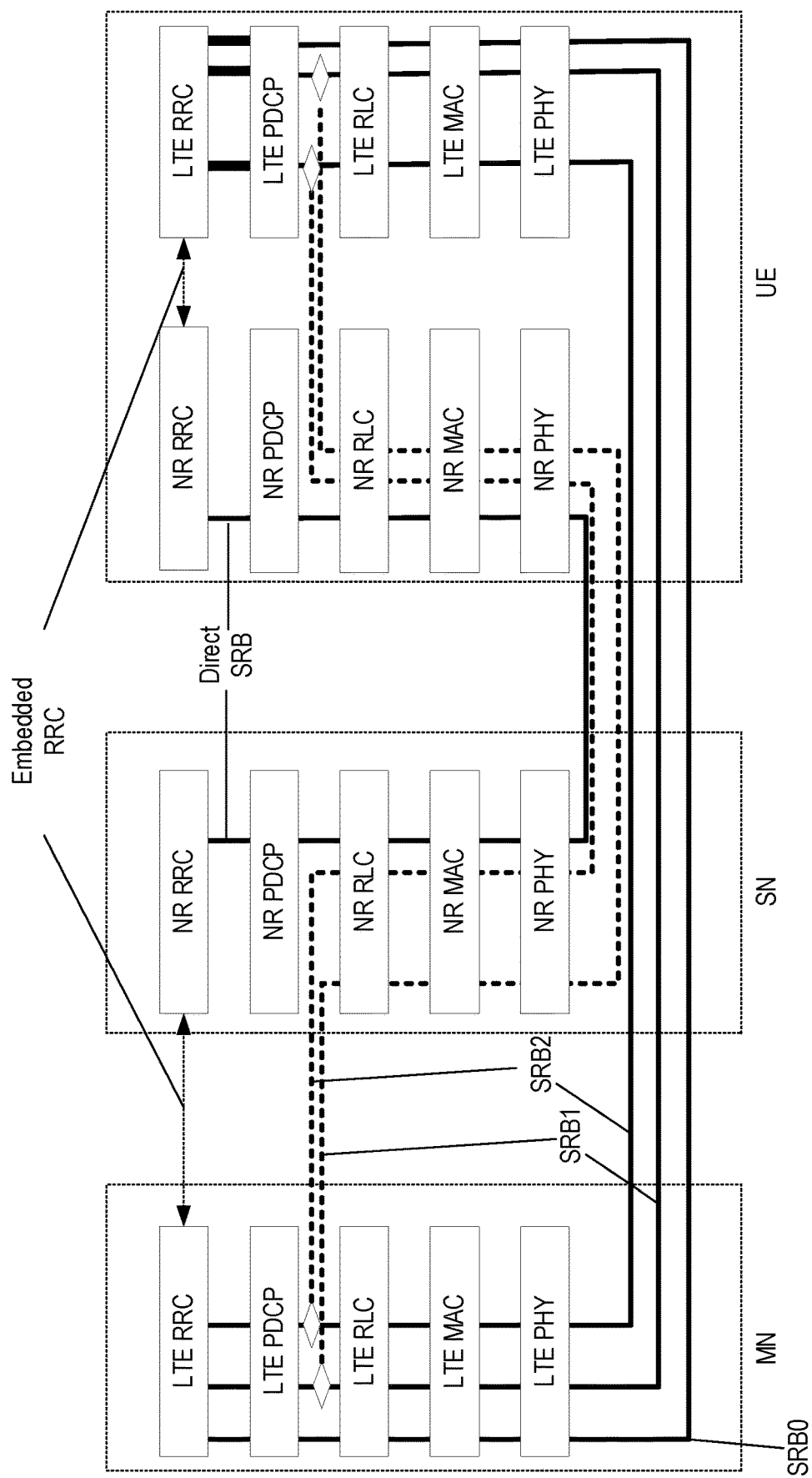
FIG. 9 shows an exemplary CP architecture for EN-DC configurations.

FIG. 7 is a block diagram showing a high-level comparison of control plane (CP) architectures in LTE DC, EN-DC, and MR-DC using a 5G core network (5GC). FIG. 8 illustrates network side user plane (UP) protocol termination options for MCG, SCG, and split bearers in EN-DC. FIG. 9 shows an exemplary CP architecture for EN-DC. These figures are provided as context for the following discussion.

One primary difference between LTE-DC and EN-DC is that in EN-DC, the SN (also referred to as SgNB) has a separate RRC entity (i.e., NR RRC). As such, the SN can also control the UE, possibly without the knowledge of the MN but often the SN needs to coordinate with the MN. This SN capability is also referred to as "direct RRC" or "SCG SRB." In LTE-DC, the RRC decisions are always made by the MN, although the SN still decides it's own configuration based on knowledge of it's own resources, capabilities, etc.

Another difference between LTE-DC and EN-DC is the introduction of a split bearer for RRC. Split RRC messages are mainly used for creating diversity, and the sender can decide to either choose one of the links for scheduling the RRC messages, or it can duplicate the message over both links. In the DL, the path switching between the MCG or SCG legs (or duplication on both) is left to network implementation. On the other hand, for the UL, the network configures the UE to use the MCG, SCG, or both for RRC messages. The terms "leg", "path" and "RLC bearer" are used interchangeably throughout this document.

In the UP, EN-DC also introduces a split bearer from the SN, also referred to as an "SCG split bearer." This is illustrated in FIG. 8. In contrast, LTE-DC includes only split bearers from MN (also referred to as "split DRB").

In LTE DC, split DRB operation in the UL is controlled by two parameters: ul-DataSplitDRB-ViaSCG and ul-DataSplitThreshold, which are configured for each DRB. The ul-DataSplitDRB-ViaSCG is a Boolean parameter, and if it set to TRUE, the SCG path is the preferred path for UL data transmission, while a value of FALSE indicates to the UE that it should send the data via the MCG path. The parameter ul-DataSplitThreshold is a buffer size threshold, such that if the size of the data available to be sent at the UE's UL buffer exceeds this value, the UE is allowed to push data to either the MCG or the SCG legs, i.e., whichever leg provides an UL grant. The handling of the path selection at the UE is captured in the following excerpt from 3GPP TS 36.323:
\*\*\*Begin excerpt from 3GPP TS 36.323\*\*\*
For split bearers, when indicating the data available for transmission to a MAC entity for BSR triggering and Buffer Size calculation, the UE shall:
if ul-DataSplitThreshold is configured and the data available for transmission is larger than or equal to ul-DataSplitThreshold:
  indicate the data available for transmission to both the MAC entity configured for SCG and the MAC entity configured for MCG;
else:
  if ul-DataSplitDRB-ViaSCG is set to TRUE by upper layer:
    indicate the data available for transmission to the MAC entity configured for SCG only;
    if ul-DataSplitThreshold is configured, indicate the data available for transmission as 0 to the MAC entity configured for MCG;
  else:
    indicate the data available for transmission to the MAC entity configured for MCG only;
    if ul-DataSplitThreshold is configured, indicate the data available for transmission as 0 to the MAC entity configured for SCG.
\*\*\*End excerpt from 3GPP TS 36.323\*\*\*

To support mobility (e.g., handover or reselection) between cells and/or beams, a UE can perform periodic cell search and measurements of signal power and quality (e.g., reference signal received power, RSRP, and reference signal received quality, RSRQ) in both RRC_CONNECTED and RRC_IDLE states. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signals (CRS), UE-specific demodulation RS (DM-RS) associated with PDSCH, DM-RS associated with EPDCCH or M/NPDCCH, positioning RS (PRS), and channel state information RS (CSI-RS).

UE measurement reports to the network can be configured to be periodic or aperiodic based a particular event. For example, the network can configure a UE to perform measurements on various carrier frequencies and various radio access technologies (RATs) corresponding to neighbor cells, as well as for various purposes including, e.g., mobility and/or positioning. The configuration for each of these measurements is referred to as a "measurement object." Furthermore, the UE can be configured to perform the measurements according to a "measurement gap pattern" (or "gap pattern" for short), which can include a measurement gap repetition period (MGRP, i.e., how often a recurring gap is available for measurements) and a measurement gap length (MGL, i.e., the length of each recurring gap).

When performing radio link monitoring (RLM), a UE monitors the radio link quality of its serving cell and uses that information to decide whether the UE is in-sync (IS) or out-of-sync (OOS) with respect to that serving cell. In particular, the UE in RRC_CONNECTED state measures downlink reference signals (e.g., CRS). In general, CRS are associated with a particular cell and can be derived by the UE based on the cell's Physical Cell Identifier (PCI). For purposes of RLM, a "cell" is the single connectivity entity transmitting both PDCCH and CRS.

If RLM indicates number of consecutive OOS conditions, then the UE starts a radio link failure (RLF) procedure and declares RLF after expiry of a timer (e.g., T310). The actual procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications. In general, RLM is performed at the PHY layer (L1).

In general, the mapping between CRS-based downlink quality and the hypothetical PDCCH BLER is UE implementation-specific. However, the performance is verified by conformance tests defined for various environments. Also, the downlink quality is calculated based on the reference signal received power (RSRP) measured for CRS distributed over the entire DL bandwidth of the cell, since UE does not know in advance the RBs in which the PDCCH will be scheduled by the network.

Figure 10:
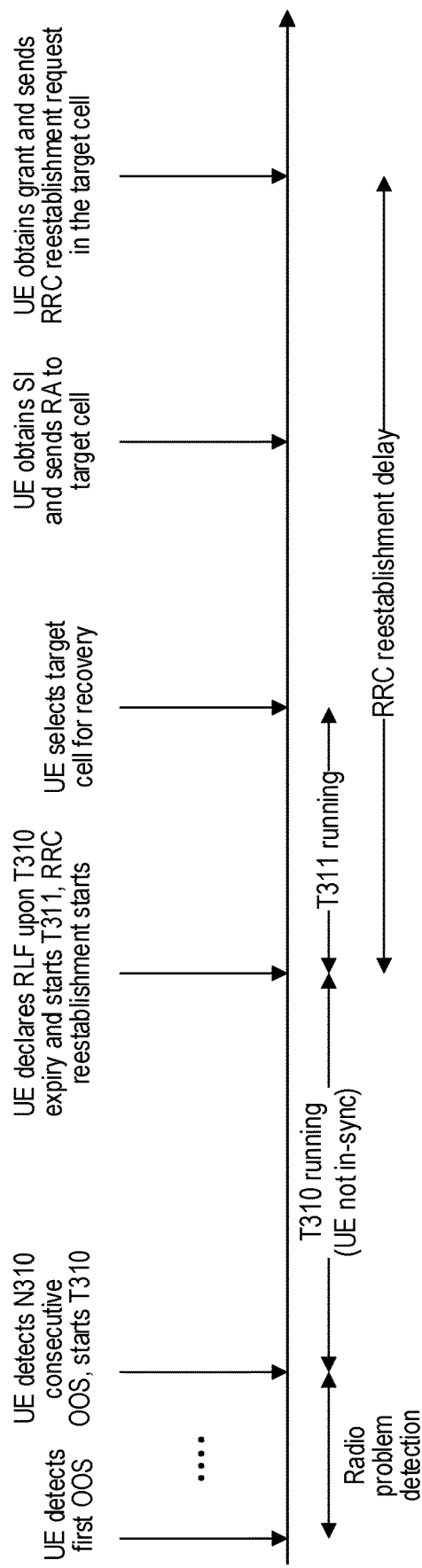
FIG. 10 shows a timeline of any exemplary UE radio link monitoring (RLM) procedure.

FIG. 10 shows a timeline of any exemplary UE RLM procedure. In general, the UE takes one RLM sample (e.g., of IS or OOS condition) per 10-ms radio frame. In this example, the UE detects N310 consecutive OOS conditions (e.g., via RLM) and then initiates timer T310. After expiry of T310, the UE declares RLF, starts RRC reestablishment including timer T311, and initiates a search for the "best" target cell. After selecting a target cell for reestablishment, the UE obtains system information (SI) for the target cell and performs a random access (e.g., via RACH). Ultimately, the UE obtains access to the target cell and sends an RRC Reestablishment Request message to the target cell, with an overall delay after initiating reestablishment. Conventionally, the UE reads the timer values for a cell from SI broadcast in the cell. Alternatively, it is possible to configure the UE with UE-specific values of the timers and constants by dedicated RRC signaling to each specific UE.

In general, a UE can select the same cell, a different cell from the same eNB or gNB, or a prepared cell from a different eNB or gNB. The advantage of a "prepared cell" is that activity can be resumed (i.e., the UE stays in RRC_CONNECTED) via radio connection re-establishment since the previous UE context can be retrieved by inter-cell communication. In general, a prepared eNB or gNB (providing a "prepared cell") has admitted the UE during an earlier executed handover preparation phase or has obtained the UE's context. When a prepared cell is not available, the UE selects an unprepared cell, which requires the UE to go to RRC_IDLE state and attempt to setup the radio connection from scratch.

Table 1 below provides further definition and/or explanation of timers T31x used in the RLF procedure for NR. The reason for introducing the timers T31x and counters N31x is to add some freedom and hysteresis for configuring the criteria for when a radio link should be considered as failed (and recovered). This is desirable, since it would hurt the end-user performance if a connection is abandoned prematurely if it turned out that the loss of link quality was temporary, and the UE succeeds in recovering the connection without any further actions or procedures (e.g. before T310 expires, or before the counting reaches value N310).

If the UE's re-establishment is successful then the UE can resume its connection. A re-establishment failure requires the UE to go to RRC_IDLE state and release the connection. To continue communication, a new RRC connection has to be requested and established.

In addition to T310 expiry, a UE may also experience RLF due to a reaching a maximum number of RLC retransmissions, due to a random-access problem (e.g., indicated by MAC layer), or due to handover failure after timer T304 expiry. During handover, T304 is started when the UE receives a handover command from the source cell, with the value of the timer T304 set to allow the UE to try the maximum random access attempts to the target cell. When the timer T304 is expired, a RLF due to handover is detected.

3GPP TS 38.331 defines procedures for UE RLF detection in an NR cell, with specific excerpts provided below (following Table 1).

TABLE 1

| Timer | Start | Stop | At expiry |
|---|---|---|---|
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If AS security is not activated: go to RRC_IDLE else: initiate the connection re-establishment procedure. If the T310 is kept in SCG, Inform E-UTRAN/NR about the SCG radio link failure by initiating the SCG failure information procedure. |
| T311 | Upon initiating the RRC connection re-establishment procedure | Upon selection of a suitable NR cell or a cell using another RAT. | Enter RRC_IDLE |
| T313 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnectionReconfiguration including MobilityControlInfoSCG | Inform E-UTRAN about the SCG radio link failure by initiating the SCG failure information procedure. |

\*\*\*Begin text from 3GPP TS 38.331\*\*\*

5.3.10 Radio Link Failure Related Actions 5.3.10.1 Detection of Physical Layer Problems in RRC_CONNECTED The UE shall:

1> upon receiving N310 consecutive "out-of-sync" indications for the SpCell from lower layers while neither T300, T301, T304, T319 not T311 is running:

2> start timer T310 for the corresponding SpCell.

5.3.10.2 Recovery of Physical Layer Problems

Upon receiving N311 consecutive "in-sync" indications for the SpCell from lower layers while T310 is running, the UE shall:

1> stop timer T310 for the corresponding SpCell.

NOTE 1: In this case, the UE maintains the RRC connection without explicit signalling, i.e. the UE maintains the entire radio resource configuration.

NOTE 2: Periods in time where neither "in-sync" nor "out-of-sync" is reported by layer 1 do not affect the evaluation of the number of consecutive "in-sync" or "out-of-sync" indications.

5.3.10.3 Detection of Radio Link Failure
The UE shall:
 1> upon T310 expiry in PCell; or
 1> upon random access problem indication from MCG MAC while neither T300, T301, T304 nor T311 is running; or
 1> upon indication from MCG RLC that the maximum number of retransmissions has been reached:
  2> if CA duplication is configured and activated; and for the corresponding logical channel allowedServingCells only includes SCell(s):
   3> initiate the failure information procedure as specified in 5.7.x to report RLC failure.
  2> else:
   3> consider radio link failure to be detected for the MCG i.e. RLF;
   3> if AS security has not been activated:
    4> perform the actions upon going to RRC_IDLE as specified in 5.3.11, with release cause 'other';
   3> else:
    4> initiate the connection re-establishment procedure as specified in 5.3.7.
The UE shall:
 1> upon T310 expiry in PSCell; or
 1> upon random access problem indication from SCG MAC; or
 1> upon indication from SCG RLC that the maximum number of retransmissions has been reached:
  2> if CA duplication is configured and activated; and for the corresponding logical channel allowedServingCells only includes SCell(s):
   3> initiate the failure information procedure as specified in 5.7.x to report RLC failure.
  2> else:
   3> consider radio link failure to be detected for the SCG i.e. SCG-RLF;
  2> initiate the SCG failure information procedure as specified in 5.7.3 to report SCG radio link failure.
*End text from 3GPP TS 38.331*

As mentioned above, LTE/NR Rel-16 introduced a fast MCG link recovery procedure. If fast MCG link recovery is configured, the UE suspends MCG transmissions for all radio bearers and reports the failure with an MCG Failure Information message to the MN via the SCG, using the SCG leg of split SRB1 or SRB3. The UE includes in this message the measurement results available according to current measurement configuration of both the MN and the SN. Once the fast MCG link recovery is triggered, the UE maintains the current measurement configurations from both the MN and the SN, and continues measurements based on these configurations, if possible. The UE initiates the RRC connection re-establishment procedure if it does not receive an RRC reconfiguration message or RRC release message within a certain time (determined by a timer called T316) after fast MCG link recovery was initiated.

Upon reception of an MCG Failure Indication message from the UE via the SN, the MN can send RRC reconfiguration message or RRC release message to the UE, using the SCG leg of split SRB1 or SRB3. Upon receiving an RRC reconfiguration message, the UE resumes MCG transmissions for all radio bearers. Upon receiving an RRC release message, the UE releases all the radio bearers and configurations.

Figure 11:
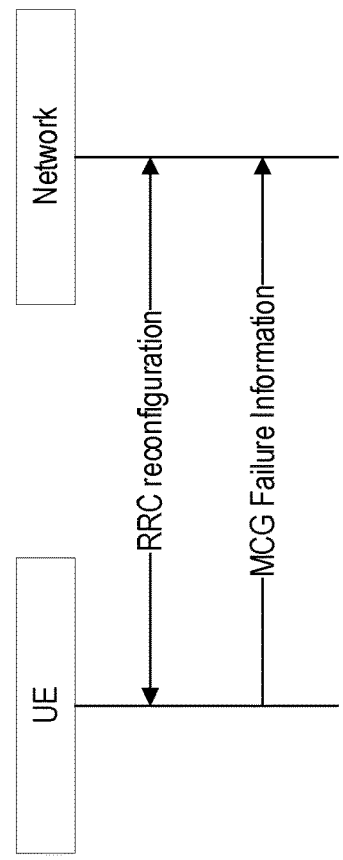
FIG. 11 shows a signal flow diagram for an exemplary Master cell group (MCG) Failure Information procedure.

FIG. 11 shows a signal flow diagram for an exemplary MCG Failure Information procedure. The following text agreed upon for 3GPP TS 37.340 and 38.331 provides further details of the fast MCG recovery procedure including the MCG Failure Information procedure shown in FIG. 11. Portions of particular interest are indicated by underline emphasis.

*Begin text for 3GPP TS 37.340*
7.7 SCG/MCG Failure Handling

RLF is declared separately for the MCG and for the SCG. If radio link failure is detected for MCG, and fast MCG link recovery is configured, the UE triggers fast MCG link recovery. Otherwise, the UE initiates the RRC connection re-establishment procedure.

During fast MCG link recovery, the UE suspends MCG transmissions for all radio bearers and reports the failure with MCG Failure Information message to the MN via the SCG, using the SCG leg of split SRB1 or SRB3.

The UE includes in the MCG Failure Information message the measurement results available according to current measurement configuration of both the MN and the SN. Once the fast MCG link recovery is triggered, the UE maintains the current measurement configurations from both the MN and the SN, and continues measurements based on configuration from the MN and the SN, if possible. The UE initiates the RRC connection re-establishment procedure if it does not receive an RRC reconfiguration message or RRC release message within a certain time after fast MCG link recovery was initiated.

Upon reception of the MCG Failure Indication, the MN can send RRC reconfiguration message or RRC release message to the UE, using the SCG leg of split SRB1 or SRB3. Upon receiving an RRC reconfiguration message, the UE resumes MCG transmissions for all radio bearers. Upon receiving an RRC release message, the UE releases all the radio bearers and configurations.

The following SCG failure cases are supported:
 SCG RLF;
 SN change failure;
 For EN-DC, NGEN-DC and NR-DC, SCG configuration failure (only for messages on SRB3);
 For EN-DC, NGEN-DC and NR-DC, SCG RRC integrity check failure (on SRB3).

Upon SCG failure, if MCG transmissions of radio bearers are not suspended, the UE suspends SCG transmissions for all radio bearers and reports the SCG Failure Information to the MN, instead of triggering re-establishment. If SCG failure is detected while MCG transmissions for all radio bearers are suspended, the UE initiates the RRC connection re-establishment procedure. In all SCG failure cases, the UE maintains the current measurement configurations from both the MN and the SN and the UE continues measurements based on configuration from the MN and the SN if possible. The SN measurements configured to be routed via the MN will continue to be reported after the SCG failure.

NOTE: UE may not continue measurements based on configuration from the SN after SCG failure in certain cases (e.g. UE cannot maintain the timing of PSCell).

The UE includes in the SCG Failure Information message the measurement results available according to current measurement configuration of both the MN and the SN. The MN handles the SCG Failure Information message and may decide to keep, change, or release the SN/SCG. In all the cases, the measurement results according to the SN configuration and the SCG failure type may be forwarded to the old SN and/or to the new SN.

\*\*\*End text for 3GPP TS 37.340\*\*\*
\*\*\*Begin text for 3GPP TS 38.331\*\*\*
5.7.y MCG Failure Information
5.7.y.1 General
The purpose of this procedure is to inform the network about an MCG failure the UE has experienced i.e. MCG radio link failure. A UE in RRC_CONNECTED, for which AS security has been activated with SRB2 and at least one DRB setup, may initiate the fast MCG link recovery procedure in order to continue the RRC connection without re-establishment.
5.7.y.2 Initiation
A UE configured with split SRB1 or SRB3 initiates the procedure to report MCG failures when neither MCG nor SCG transmission is suspended, T316 is configured, and when the following condition is met:
    1> upon detecting radio link failure of the MCG, in accordance with 5.3.10.3, while T316 is not running.
Upon initiating the procedure, the UE shall:
    1> suspend MCG transmission for all SRBs and DRBs, except SRB0;
    1> reset MCG-MAC;
    1> initiate transmission of the MCGFailureInformation message in accordance with 5.7.y.4.
    NOTE: The handling of any outstanding UL RRC messages during the initiation of the fast MCG link recovery is left to UE implementation.
5.7.y.3 Failure Type Determination
The UE shall set the MCG failure type as follows:
    1> if the UE initiates transmission of the MCGFailureInformation message due to T310 expiry:
        2> set the failure Type as t310-Expiry;
    1> else if the UE initiates transmission of the MCGFailureInformation message to provide random access problem indication from MCG MAC:
        2> set the failure Type as randomAccessProblem;
    1> else if the UE initiates transmission of the MCGFailureInformation message to provide indication from MCG RLC that the maximum number of retransmissions has been reached:
        2> set the failure Type as rlc-MaxNumRetx.
5.7.y.4 Actions related to transmission of MCGFailureInformation message
The UE shall set the contents of the MCGFailureInformation message as follows:
    1> include and set failure Type in accordance with 5.7.y.3;
    1> for each MeasObjectNR configured by a measConfig associated with the MCG, and for which measurement results are available:
        2> include an entry in measResultFreqlist;
        2> if there is a measId configured with the MeasObjectNR and a reportConfig which has rsType set to ssb:
            3> set ssbFrequency in measResultFreqList to the value indicated by ssbFrequency as included in the MeasObjectNR;
        2> if there is a measId configured with the MeasObjectNR and a reportConfig which has rsType set to csi-rs:
            3> set refFreqCSI-RS in measResultFreqList to the value indicated by refFreqCSI-RS as included in the associated measurement object;
        2> if a serving cell is associated with the MeasObjectNR:
            3> set measResultServingCell in measResultFreqList to include the available quantities of the concerned cell and in accordance with the performance requirements in TS 38.133 [14];
        2> set the measResultNeighCellList in measResultFreqList to include the best measured cells, ordered such that the best cell is listed first, and based on measurements collected up to the moment the UE detected the failure, and set its fields as follows;
            3> ordering the cells with sorting as follows:
                4> based on SS/PBCH block if SS/PBCH block measurement results are available and otherwise based on CSI-RS;
                4> using RSRP if RSRP measurement results are available, otherwise using RSRQ if RSRQ measurement results are available, otherwise using SINR;
            3> for each neighbour cell included:
                4> include the optional fields that are available.
    1> for each EUTRA frequency the UE is configured to measure by measConfig for which measurement results are available:
        2> set the measResultFreqListEUTRA to include the best measured cells, ordered such that the best cell is listed first using RSRP to order if RSRP measurement results are available for cells on this frequency, otherwise using RSRQ to order if RSRQ measurement results are available for cells on this frequency, otherwise using SINR to order, and based on measurements collected up to the moment the UE detected the failure, and for each cell that is included, include the optional fields that are available;
    1> if the UE is in NR-DC:
        2> include and set measResultSCG in accordance with 5.7.3.4;
    1> if the UE is in NE-DC:
        2> include and set measResultSCG-EUTRA in accordance with TS 36.331 [10] clause 5.6.13.5;
    NOTE 1: The measured quantities are filtered by the L3 filter as configured in the mobility measurement configuration. The measurements are based on the time domain measurement resource restriction, if configured. Blacklisted cells are not required to be reported.
    NOTE 2: Field measResultSCG-Failure is used to report available results for NR frequencies the UE is configured to measure by SCG RRC signalling.
    NOTE 3: Field measResultSCG-EUTRA is used to report available results for E-UTRAN frequencies the UE is configured to measure by E-UTRA RRC signalling.
    1> if SRB1 is configured as split SRB and pdcp-Duplication is not configured:
        2> if primaryPath refers to the MCG:
            3> set primaryPath to refer to the SCG.
The UE shall:
    1> start timer T316;
    1> if SRB1 is configured as split SRB:
        2> submit the MCGFailureInformation message to lower layers for transmission via SRB1, upon which the procedure ends;
        2> else (i.e. SRB3 configured):
            3> submit the MCGFailureInformation message to lower layers for transmission embedded in NR RRC message ULlnformationTransferMRDC via SRB3 as specified in 5.7.2a.3.

5.7.y.5 T316 Expiry
The UE shall:
1> if T316 expires:
2> initiate the connection re-establishment procedure as specified in 5.3.7.
\*\*\*End text for 3GPP TS 38.331\*\*\*

As illustrated by underline emphasis in the above text, the UE "suspends MCG transmission for all SRBs and DRBs, except SRB0" upon the initiation of the MCG failure information reporting. Moreover, to ensure that the MCG failure information will be sent via the SCG leg of the split SRB1, the UE also switches the primary path of the split SRB1 from MCG to SCG.

These operations do not impact the handling of SCG bearers, i.e., bearers configured to use only the SCG radio, whether they are terminated at the MN or SN. As such, the UL/DL transmission of data belonging to those bearers can continue as before the MCG RLF detection. On the other hand, the MCG bearers (i.e., bearers configured to use only MCG radio, whether they are terminated at the MN or SN) will be suspended, as expected.

For split bearers, however, the above-described handling can result in sub-optimal behavior, specifically for the split DRBs where the primary path is the MCG. As discussed above, for split bearers, as long as the buffered data is below the ul-DataSplitThreshold, the UE will request UL grants (as needed) and send the data belonging to the split DRBs only via the primary path. Thus, split DRBs with MCG as the primary path, where the buffered data is below the ul-DataSplitThreshold will also be practically suspended until the MCG is recovered. In other words, the transmission of data for the split DRBs can be suspended for up to the duration of T310 (started when physical layer problems for the PCell was detected, stopped when RLF is detected) plus the duration of T316 (started when MCG failure information report is sent after RLF, stopped when RRC Reconfiguration or RRC release is received).

In LTE and NR, T310 can have a value up to six (6) seconds and it has been agreed that T316 can be up to two (2) seconds. As such, a split DRB can be suspended for up to eight (8) seconds while the MCG failure is being detected and recovered, even though there is a operational SCG leg that could have been used to transport the data. As a simple example, assuming an EN-DC scenario, where the UE has a 200-Mb/s NR link via the SCG, the UE will have missed an opportunity to send more than 1.5 Gbits of data.

Exemplary embodiments of the present disclosure address these and other problems, challenges, and/or issues by providing techniques and/or mechanisms allow a UE to utilize the alternate path of a split DRBs to send data during the detection and recovery failure over the configured primary path. In different embodiments, his can be facilitated either by autonomously switching the primary path to the path not experiencing radio link problems, or by modifying the UL buffer split threshold to a value equal to zero or a very small amount. In the latter embodiment, the UE can report the data volume to both MCG and SCG legs and can receive an UL grant from the leg that is not experiencing the RLF.

Such embodiments can provide various exemplary benefits, advantages, and/or improvements to conventional handover operation. For example, the UE will be able to use a split DRB connection and/or path that is operating properly to transport the data while the primary path for the split DRB is being recovered. In this way, unnecessary data transmission interruptions are avoided during failure recovery, and the transmission and/or reception of user-plane data can be continued without interruption.

As described below, various embodiments involve operations performed by a UE configured in dual connectivity (DC) with a MN serving of one or more cells of an MCG, of which one is a PCell for the UE, and an SN serving of one or more cells of an SCG, of which one a PSCell for the UE. A first group of embodiments involve UE behavior during failure detection and recovery of an MCG link, and a second group of embodiments involve UE behavior during failure detection and recovery of an SCG link.

In some embodiments of the first group, the UE can detect a physical layer (PHY) problem with a radio link to the PCell. For example, the UE can detect the problem by receiving N310 consecutive OOS indications for the PCell from lower layers (e.g., PHY). Upon detecting the PHY problem with the PCell, the UE can start a timer (e.g. T310) and, for each split DRB that has primary path set to MCG, switch the primary path to SCG. Subsequently, upon detecting the radio link to the PCell has recovered (e.g., receiving N311 consecutive IS indications from lower layers) before the expiry of the timer, the UE can stop the timer and switch the primary path of the split DRBs (i.e., whose path was previously switched upon problem detection) back to the MCG.

In other embodiments of the first group, the UE can detect a radio link failure (RLF) with the PCell. For example, the UE can detect RLF upon T310 expiry in PCell, upon random access problem indication from MCG MAC while neither T300, T301, T304, T311 nor T319 are running, or upon indication from MCG RLC that the maximum number of retransmissions has been reached. Upon detecting the PCell RLF, the UE can check that MCG failure recovery is configured, start a timer, and initiate an MCG failure recovery procedure. For example, the UE can check that T316 is configured and start T316. The MCG failure recovery procedure can include suspending the MCG transmission for all radio bearers except SBR0, and for each split DRBs that has primary path set to MCG, switch the primary path to SCG. Subsequently, upon detecting the radio link to the PCell has recovered (e.g., by reception of an RRC Reconfiguration message with reconfiguration with sync (NR), or an RRC Connection Reconfiguartion message with mobility control information (LTE)), the UE can stop the timer and switch the primary path of the split DRBs (i.e., whose path was switched upon MCG failure recovery initiation) back to the MCG and resume MCG transmission for all radio bearers. Alternately, if the UE does not switch back the primary path, the network can switch the primary path explicitly in the RRC Reconfiguration (NR) or RRC Connection Reconfiguration message (LTE) message.

In other embodiments of the first group, the UE can detect a physical layer (PHY) problem with a radio link to the PCell. For example, the UE can detect the problem by receiving N310 consecutive OOS indications for the PCell from lower layers (e.g., PHY). Upon detecting the PHY problem with the PCell, the UE can start a timer (e.g. T310) and, for each split DRB that has primary path set to MCG, store the current ul-DataSplitThreshold in a local variable and set the ul-DataSplitThreshold to value b0 (e.g., b0=0). Subsequently, upon detecting the radio link to the PCell has recovered (e.g., receiving N311 consecutive IS indications from lower layers) before the expiry of the timer, the UE can stop the timer and for each split DRB that has primary path set to MCG, restore the ul-DataSplitThreshold to the value that was previously stored in the local variable.

In other embodiments of the first group, the UE can detect a radio link failure (RLF) with the PCell. For example, the UE can detect RLF upon T310 expiry in PCell, upon random access problem indication from MCG MAC while neither T300, T301, T304, T311 nor T319 are running, or upon indication from MCG RLC that the maximum number of retransmissions has been reached. Upon detecting the PCell RLF, the UE can check that MCG failure recovery is configured, start a timer, and initiate an MCG failure recovery procedure. For example, the UE can check that T316 is configured and start T316. The MCG failure recovery procedure can include suspending the MCG transmission for all radio bearers except SBR0. In addition, for each split DRB that has primary path set to MCG, the UE can save the current ul-DataSplitThreshold in a local variable and set the ul-DataSplitThreshold to value b0 (e.g., b0=0). Subsequently, upon detecting the radio link to the PCell has recovered (e.g., by reception of an RRC Reconfiguration message with reconfiguration with sync (NR), or an RRC Connection Reconfiguartion message with mobility control information (LTE)), the UE can stop the timer and, for each split DRB that has primary path set to MCG, restore the ul-DataSplitThreshold to the value that was previously stored in the local variable. The UE can then resume the MCG transmission for all radio bearers Alternately, if the UE does not restore the value stored in the local variable, the network can do it explicitly in the RRC Reconfiguration (NR) or RRC Connection Reconfiguration (LTE) message.

In some embodiments of the second group, the UE can detect a physical layer (PHY) problem with a radio link to the PSCell. For example, the UE can detect the problem by receiving N310 consecutive OOS indications for an NR PSCell from lower layers (e.g., PHY), or by receiving N313 consecutive OOS indications for an LTE PSCell from lower layers. Upon detecting the PHY problem with the PSCell, the UE can start a timer (e.g. T310 in NR, T313 in LTE) and, for each split DRB that has primary path set to SCG, switch the primary path to MCG. Subsequently, upon detecting the radio link to the PSCell has recovered (e.g., receiving N311 (NR) or N314 (LTE) consecutive IS indications from lower layers) before the expiry of the timer, the UE can stop the timer and switch the primary path of the split DRBs (i.e., whose path was previously switched upon problem detection) back to the SCG.

In other embodiments of the second group, the UE can detect a radio link failure (RLF) with the PSCell. For example, the UE can detect RLF upon any of the following:
expiry of T310 in an NR PSCell or T313 in an LTE PSCell;
indication from SCG RLC that maximum number of retransmissions is reached,
reconfiguration with sync failure of the SCG for NR or SCG change failure for LTE;
SCG configuration failure in NR;
integrity check failure indication a signaling radio bearer (e.g., for SRB3 as provided by NR SCG lower layers); or
stopping UL transmission due to exceeding a maximum UL transmission timing difference (e.g., to an LTE PSCell when powerControlMode is configured to "1").

Upon detecting the PSCell RLF, the UE can verify that MCG failure recovery is not ongoing (e.g., MCG is not suspended) and then initiate an SCG failure recovery procedure. This procedure can include suspending the SCG transmission for all radio bearers and for each split DRB that has primary path set to SCG, switching the primary path to MCG. Subsequently, upon detecting the radio link to the PSCell has recovered (e.g., by reception of an RRC Reconfiguration message with reconfiguration with sync (NR), or an RRC Connection Reconfiguartion message with mobility control information (LTE)), the UE can switch the primary path of the split DRBs (i.e., whose path was switched upon SCG failure recovery initiation) back to the SCG and resume SCG transmission for all radio bearers. Alternately, if the UE does not switch back the primary path, the network can switch the primary path explicitly in the RRC Reconfiguration (NR) or RRC Connection Reconfiguration (LTE) message.

In other embodiments of the second group, the UE can detect a physical layer (PHY) problem with a radio link to the PSCell. For example, the UE can detect the problem by receiving N310/N313 consecutive OOS indications from lower layers for an NR/LTE PSCell. Upon detecting the PHY problem with the PSCell, the UE can start a timer (e.g. T310/T313 for NR/LTE PSCell) and, for each split DRB that has primary path set to SCG, store the current ul-DataSplitThreshold in a local variable and set the ul-DataSplitThreshold to value b0 (e.g., b0=0). Subsequently, upon detecting the radio link to the PCell has recovered (e.g., receiving N311/N314 consecutive IS indications from lower layers for NR/LTE PSCell) before the expiry of the timer, the UE can stop the timer and for each split DRB that has primary path set to SCG, restore the ul-DataSplitThreshold to the value that was previously stored in the local variable.

In other embodiments of the second group, the UE can detect a radio link failure (RLF) with the PSCell. For example, the UE can detect RLF upon any of the following:
expiry of T310 in an NR PCell or T313 in an LTE PSCell;
indication from SCG RLC that maximum number of retransmissions is reached,
reconfiguration with sync failure of the SCG for NR or SCG change failure for LTE;
SCG configuration failure in NR;
integrity check failure indication for SRB3 from NR SCG lower layers; or
stopping UL transmission due to exceeding a maximum UL transmission timing difference (e.g., to an LTE PSCell when powerControlMode is configured to "1").

Upon detecting the PSCell RLF, the UE can verify that MCG failure recovery is not ongoing (e.g., MCG is not suspended) and then initiate an SCG failure recovery procedure. This procedure can include suspending the SCG transmission for all radio bearers and for each split DRB that has primary path set to SCG, store the current ul-DataSplitThreshold in a local variable and set the ul-DataSplitThreshold to value b0 (e.g., b0=0). Subsequently, upon detecting the radio link to the PCell has recovered (e.g., by reception of an RRC Reconfiguration message with reconfiguration with sync (NR), or an RRC Connection Reconfiguartion message with mobility control information (LTE)), the UE can, for each split DRB that has primary path set to SCG, restore the ul-DataSplitThreshold to the value that was previously stored in the local variable. The UE can then resume the SCG transmission for all radio bearers. Alternately, if the UE does not restore the value stored in the local variable, the network can do it explicitly in the RRC Reconfiguration (NR) or RRC Connection Reconfiguration (LTE) message.

In various embodiments described above, the UE behavior and/or operations can be configured by the network. For example, the network can configure the UE to switch the primary path of split DRBs to the alternate path upon failure detection/recovery on the primary path, or to set the ul-DataSplitThreshold of split DRBs to zero (or a small amount) upon failure detection/recovery on the primary path. The network configuration can be applicable to all split DRBs (such as by providing it in the radioBearerConfig information element (IE) of an RRCReconfiguration message), or it can be specific to a particular split DRB (e.g., as provided in the pdcp-Config of the DRB).

In certain embodiments, the network can likewise configure the UE's switching back or reversion of the primary path or the UE's reversion of the ul-DataSplitThreshold to the one configured before failure detection or recovery initiation. If such behaviour is configured to not be applied by the UE, the UE will continue using the configured primary path and/or the configured ul-DataSplitThreshold until instructed otherwise by the network.

In some embodiments, when an MCG failure information message is received from a UE, if the source node decides to maintain a split bearer (e.g., SRB or DRB) using the same SN but changing of MN (e.g., handover), the source node (e.g., source MN) can send a handover preparation information message to a target node (e.g., target MN) that indicates, in the UE context, that the primary path for the split bearer has been set to SCG by the UE.

In other embodiments, when an MCG failure information message is received from a UE, if the source node decides to maintain a split bearer (e.g., SRB or DRB), the source node (e.g., source MN) can send a handover preparation information message to a target node (e.g., target MN) that indicates in a flag that the handover is due to a failure at the MCG. This flag can represent an implicit indication for the target node that the primary path of the split SRB/DRB has been switched by the UE to SCG. Based on this indication, the target node can configure the UE to switch the primary path back to MCG when sending the RRCReconfiguration message to the UE. In other embodiments, when receiving the handover preparation information message from the source node, the target node can set that the primary path for split bearers to MCG, regardless of whether an MCG failure information procedure has been triggered.

In some embodiments, when an MCG failure information message is received from a UE, if the source node decides to maintain a split bearer (e.g., SRB or DRB) using the same SN but changing of MN (e.g., handover), the source node (e.g., source MN) can send a handover preparation information message to a target node (e.g., target MN) that indicates, in the UE context, that the ul dataSplitThreshold has been set to zero (or a small amount) for the split DRBs.

In other embodiments, when an MCG failure information message is received from a UE, if the source node decides to maintain a split bearer (e.g., SRB or DRB), the source node (e.g., source MN) can send a handover preparation information message to a target node (e.g., target MN) that indicates in a flag that the handover is due to a failure at the MCG. This flag can represent an implicit indication for the target node that that the ul dataSplitThreshold of the split DRB has been set to zero or some low value. Based on this indication, the target node can configure the UE to switch the ul-dataSplitThreshold back to the previously configured value in the RRCReconfiguration message sent to the UE. In other embodiments, when receiving the handover preparation information message from the source node, the target node can always reconfigure the split DRBs by setting the ul dataSplitThreshold to the previous value, regardless of whether an MCG failure information procedure has been triggered.

Principles of the above-described embodiments can also be applied to scenarios involving SCG failures.

In some embodiments, when an SCG failure information message is received from a UE, if the source node (e.g., MN) decides to maintain a split DRB terminated at the SN but to change SN, the source node can send a handover preparation information message to a target node (e.g., target SN) that indicates, in the UE context, that the primary path for the split bearer has been set to MCG by the UE. In other embodiments, the MN can indicate to the target SN that the SN change/addition is due to SCG failure. This indication also implicit indicates, to the target node, that the primary path of the split DRBs has been switched by the UE to MCG. Based on this information, the target SN can configure the UE to switch back the primary path to SCG when sending the SCG configuration to the UE. For example, the SCG configuration can received embedded in a RRCReconfiguration message from the MN. In other embodiments, the target SN can always sets the primary path for the SN-terminated split DRBs back to the SCG if it detects that an SN addition is being performed by the MN.

In some embodiments, when an SCG failure information message is received from a UE, if the source node (e.g., MN) decides to maintain a split DRB terminated at the SN but to change SN, the source node can send an SCG configuration to the target SN that indicates, in the UE context, that the ul dataSplitThreshold for the SN-terminated split DRBs has been set to zero or some low value. In some embodiments, the source MN can indicate to the target SN that the SN change/addition is due to SCG failure, which can represent an implicit indication for the target SN that the ul-dataSplit-Threshold of the SN-terminated split DRBs has been set to zero or some low value. Based on this information, the target SN can configure the UE to switch the ul-dataSplitThreshold back to the previously configured value when sending the SCG configuration to the UE. For example, the SCG configuration can received embedded in a RRCReconfiguration message from the MN. In other embodiments, the target SN can always set the ul-dataSplitThreshold of SN-terminated split DRBs to the previously configured value if it detects that an SN addition is being performed by the MN (e.g., regardless of whether SCG failure information procedure has been triggered).

Figure 12:
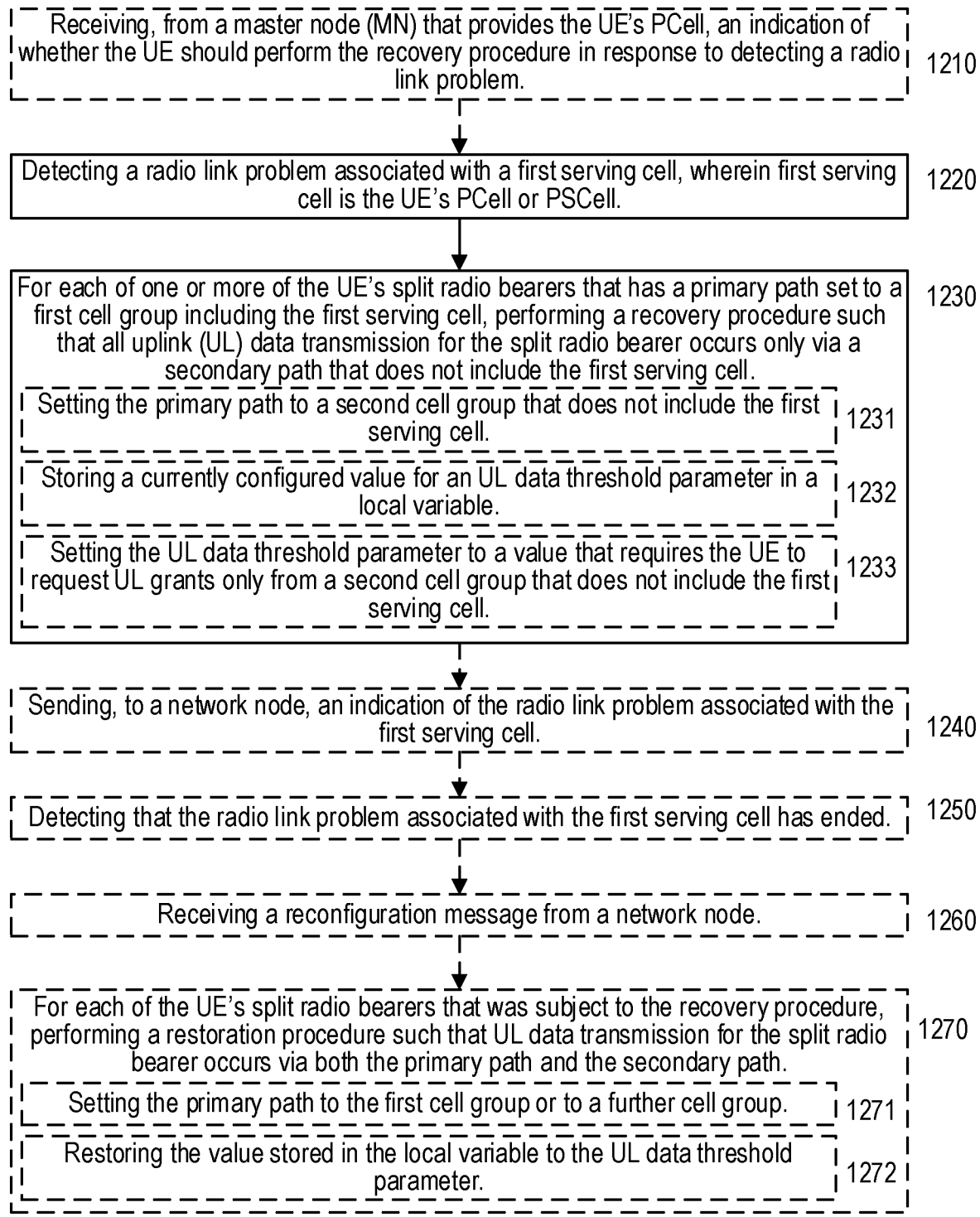
FIG. 12 illustrates an exemplary method (e.g., procedure) performed by a UE, according to various exemplary embodiments of the present disclosure.
Figure 13:
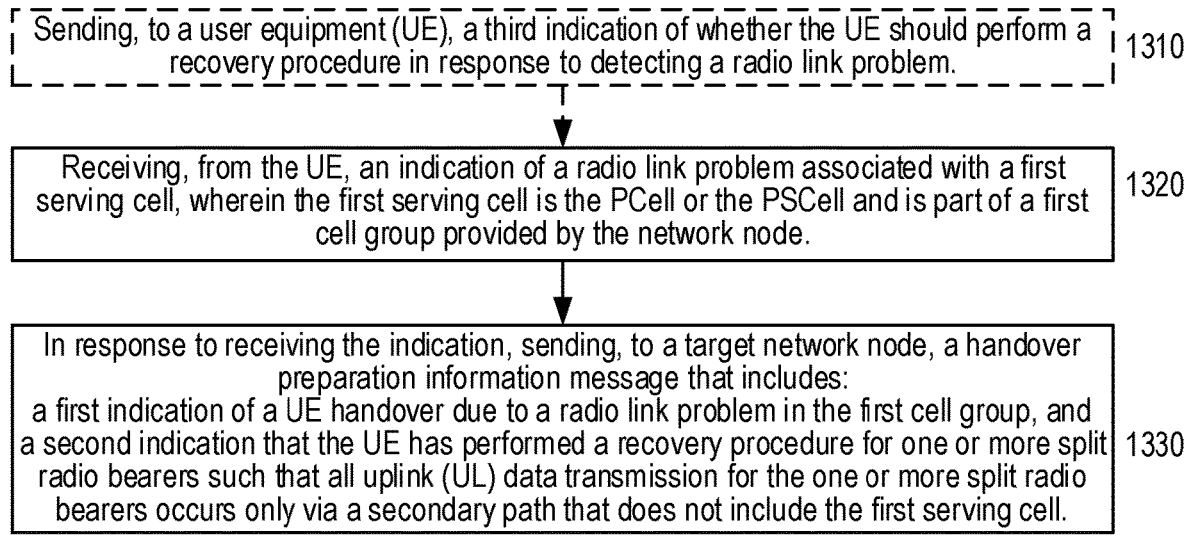
FIGS. 13-14 illustrate exemplary methods (e.g., procedures) performed by a network node, according to various exemplary embodiments of the present disclosure.
Figure 14:
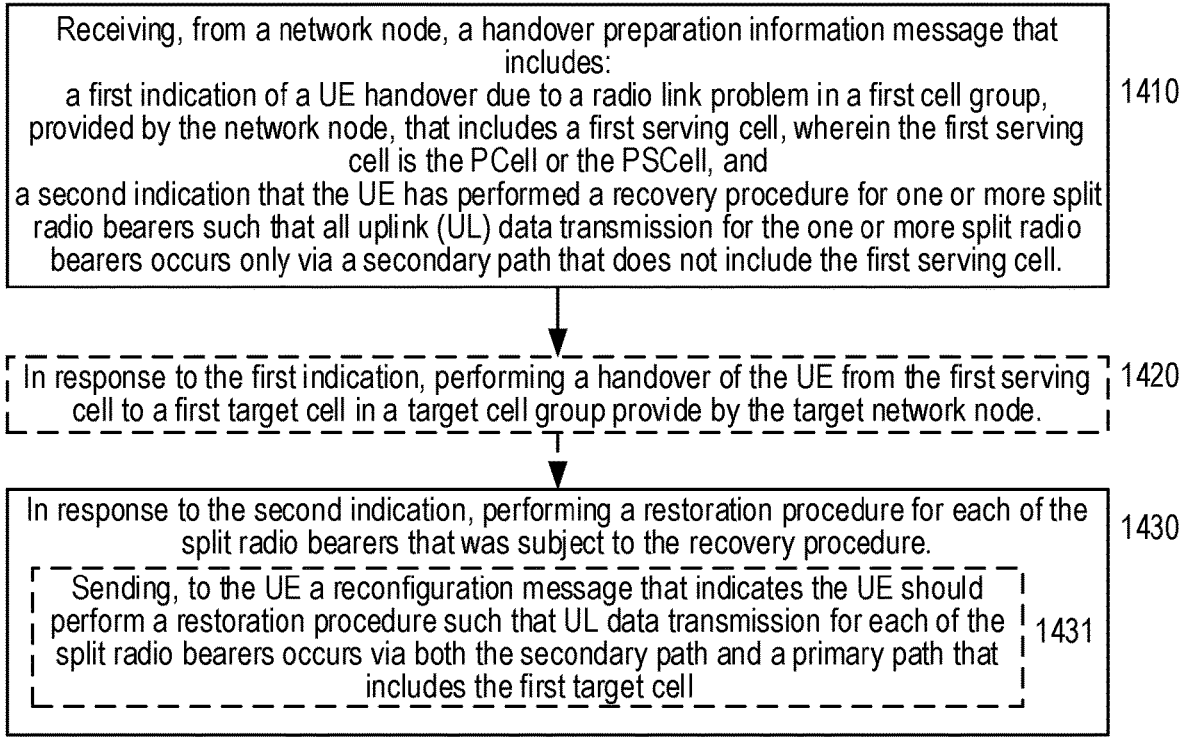

The embodiments described above can be further illustrated with reference to FIGS. 12-14, which depict exemplary methods (e.g., procedures) performed by UEs and network nodes. In other words, various features of the operations described below, with reference to FIGS. 12-14, correspond to various embodiments described above. Although the exemplary methods are illustrated in FIGS. 12-14 by specific blocks in particular orders, the operations of the blocks can be performed in different orders than shown and can be combined and/or divided into blocks having different functionality than shown. Furthermore, the exemplary methods illustrated in FIGS. 12-14 can be used cooperatively to provide various benefits, advantages, and/or solutions to problems described herein. Optional blocks or operations are indicated by dashed lines.

In particular, FIG. 12 illustrates an exemplary method (e.g., procedure) performed by a user equipment (UE) configured for dual connectivity (DC) with a master node (MN) providing a master cell group (MCG) that includes a primary serving cell (PCell), and with a secondary node (SN) providing a secondary cell group (SCG) that includes a primary secondary cell (PSCell), according to various exemplary embodiments of the present disclosure. For example, the exemplary method shown in FIG. 12 can be implemented in a UE (e.g., wireless device) configured according to other figures described herein.

The exemplary method can include the operations of block 1220, where the UE can detect a radio link problem associated with a first serving cell, wherein first serving cell is the UE's PCell or PSCell. In various embodiments, the radio link problem can be any one of the following: a radio link failure (RLF) associated with the PCell; a physical layer (PHY) problem associated with the PCell; a radio link failure (RLF) associated with the PSCell; or a physical layer (PHY) problem associated with the PSCell. In various embodiments, the handover preparation message can be associated with a change of PCell/MCG/MN or a change of PSCell/SCG/SN.

The exemplary method can also include the operations of block 1230, where the UE can, in response to detecting the radio link problem (e.g., in block 1220), and for each of one or more of the UE's split radio bearers that has a primary path set to a first cell group including the first serving cell, perform a recovery procedure such that all uplink (UL) data transmission for the split radio bearer occurs only via a secondary path that does not include the first serving cell.

In some embodiments, the exemplary method can also include the operations of block 1210, where the UE can receive, from the MN, an indication of whether the UE should perform the recovery procedure in response to detecting the radio link problem. In such embodiments, the recovery procedure (e.g., in block 1230) can be performed selectively based on the indication. In some of these embodiments, the received indication can include respective indications associated with respective split radio bearers; in such case, the recovery procedure can be performed selectively for the respective split radio bearers based on the respective indications.

In some embodiments, the exemplary method can also include the operations of block 1240, where the UE can send, to a network node (e.g., MN or SN), an indication of the radio link problem associated with the first serving cell. For example, the indication can be sent in an MCG failure information message or an SCG failure information message.

In some embodiments, the exemplary method can also include the operations of block 1250, where the UE can, for each of the UE's split radio bearers that was subject to the recovery procedure (e.g., in block 1230), perform a restoration procedure such that UL data transmission for the split radio bearer occurs via both the primary path and the secondary path. In various embodiments, performing the restoration procedure can be in response to the UE detecting that the radio link problem associated with the first serving cell has ended (e.g., in block 1250) or the UE receiving a reconfiguration message from a network node (e.g., in block 1260, from MN, SN, or target node for UE handover).

In some embodiments, performing the recovery procedure in block 1230 can include the operations of sub-block 1231, where the UE can set the primary path to a second cell group that does not include the first serving cell. For example, if the radio link problem is associated with the PCell, the UE can set the primary path to the SCG. Likewise, if the radio link problem is associated with the PSCell, the UE can set the primary path to the MCG. In such embodiments, performing the restoration procedure in block 1270 can include the operations of sub-block 1271, where the UE can set the primary path to the first cell group or to a further cell group (e.g., provided by a target node for UE handover).

In other embodiments, performing the recovery procedure in block 1230 can include the operations of sub-blocks 1232-1233. In sub-block 1232, the UE can store a currently configured value for an UL data threshold parameter (e.g., ul-dataSplitThreshold) in a local variable. In sub-block 1233, the UE can set the UL data threshold parameter to a value (e.g., zero or very small value) that requires the UE to request UL grants only from a second cell group that does not include the first serving cell. For example, if the radio link problem is associated with the PCell, the UE can set the value such that the UE only requests UL grants from the SCG. Likewise, if the radio link problem is associated with the PSCell, the UE can set the value such that the UE only requests UL grants from the MCG. In such embodiments, performing the restoration procedure in block 1270 can include the operations of sub-block 1272, where the UE can restore the value stored in the local variable to the UL data threshold parameter.

In addition, FIG. 13 illustrates an exemplary method (e.g., procedure) performed by network node configured in DC with a UE via an MCG that includes a PCell or via an SCG that includes a PSCell, according to various exemplary embodiments of the present disclosure. The exemplary method can be performed by a network node (e.g., base station, eNB, gNB, etc., or component thereof) that is the UE's MN or SN, such as a network node configured according to other figures described herein.

The exemplary method can include the operations of block 1320, where the network node can receive, from the UE, an indication of a radio link problem associated with a first serving cell. The first serving cell is the UE's PCell or PSCell and is part of a first cell group provided by the network node. For example, if the first serving cell is the UE's PCell, then the network node is the UE's MN and the first cell group is the MCG. Likewise, if the first serving cell is the UE's PSCell, then the network node is the UE's SN and the first cell group is the SCG.

The exemplary method can also include the operations of block 1330, where the network node can, in response to receiving the indication, send a handover preparation information message to a target network node. The handover preparation information message can include a first indication of a UE handover due to a radio link problem in the first cell group, and a second indication that the UE has performed a recovery procedure for one or more split radio bearers such that all uplink (UL) data transmission for the one or more split radio bearers occurs only via a secondary path that does not include the first serving cell.

In various embodiments, the radio link problem can be any one of the following: a RLF associated with the PCell; a PHY problem associated with the PCell; a RLF associated with the PSCell; or a PHY problem associated with the PSCell.

In some embodiments, the exemplary method can also include the operations of block 1310, where the network node can send, to the UE, a third indication of whether the UE should perform the recovery procedure in response to detecting the radio link problem. For example, if the network node sends the UE a third indication that it should perform the recovery procedure, then the network node can assume that the UE performs the recovery procedure, and can indicate the same to the target network node (e.g., in block 1330). In some embodiments, the third indication can include respective indications associated with respective split radio bearers.

In some embodiments, the second indication can indicate that, for each of the split radio bearers, the UE has set the primary path to a second cell group that does not include the first serving cell. These embodiments correspond to the embodiments described above with respect to sub-block 1231 of FIG. 12.

In other embodiments, the second indication can indicate that, for each of the split radio bearers, the UE has stored a currently configured value for an UL data threshold parameter in a local variable, and set the UL data threshold parameter to a value that requires the UE to request UL grants only from a second cell group that does not include the first serving cell. These embodiments correspond to the embodiments described above with respect to sub-blocks 1232-1233 of FIG. 12.

In addition, FIG. 14 illustrates an exemplary method (e.g., procedure) performed by a target network node for a UE configured in DC via an MCG that includes a PCell and an SCG that includes a PSCell, according to various exemplary embodiments of the present disclosure. The exemplary method can be performed by a network node (e.g., base station, eNB, gNB, etc., or component thereof) that is a handover target by the UE's MN or SN, such as a network node configured according to other figures described herein.

The exemplary method can include the operations of block 1410, where the target network node can receive a handover preparation information message from a network node. For example, the handover preparation information message can include a first indication of a UE handover due to a radio link problem in a first cell group, provided by the network node, that includes a first serving cell that is the UE's PCell or PSCell. The handover preparation message can also include a second indication that the UE has performed a recovery procedure for one or more split radio bearers such that all uplink (UL) data transmission for the one or more split radio bearers occurs only via a secondary path that does not include the first serving cell.

In various embodiments, the radio link problem can be any one of the following: a RLF associated with the PCell; a PHY problem associated with the PCell; a RLF associated with the PSCell; or a PHY problem associated with the PSCell.

The exemplary method can also include the operations of block 1430, where the target network node can, in response to the second indication, perform a restoration procedure for each of the split radio bearers that was subject to the recovery procedure.

In some embodiments, the exemplary method can also include the operations of block 1420, where the target network node can, in response to the first indication, perform a handover of the UE from the first serving cell to a first target cell in a target cell group provide by the target network node. In such embodiments, performing the restoration procedure in block 1430 can include the operations of sub-block 1431, where the target network node can send, to the UE, a reconfiguration message that indicates the UE should perform a restoration procedure such that UL data transmission for each of the split radio bearers occurs via both the secondary path and a primary path that includes the first target cell (e.g., instead of the first serving cell).

In some embodiments, the second indication can indicate that, for each of the split radio bearers, the UE has set the primary path to a second cell group that does not include the first serving cell. In such embodiments, the reconfiguration message can indicate that, for each of the split radio bearers, the UE should set the primary path to a first target cell group that includes the first target cell. These embodiments correspond to the embodiments described above with respect to sub-block 1231 of FIG. 12.

In other embodiments, the second indication can indicate that the UE has, for each of the split radio bearers, stored a currently configured value for an UL data threshold parameter in a local variable and set the UL data threshold parameter to a value that requires the UE to request UL grants only from a second cell group that does not include the first serving cell. In such embodiments, the reconfiguration message can indicate that, for each of the split radio bearers, the UE should restore the value stored in the local variable to the UL data threshold parameter. These embodiments correspond to the embodiments described above with respect to sub-blocks 1232-1233 of FIG. 12.

Figure 15:
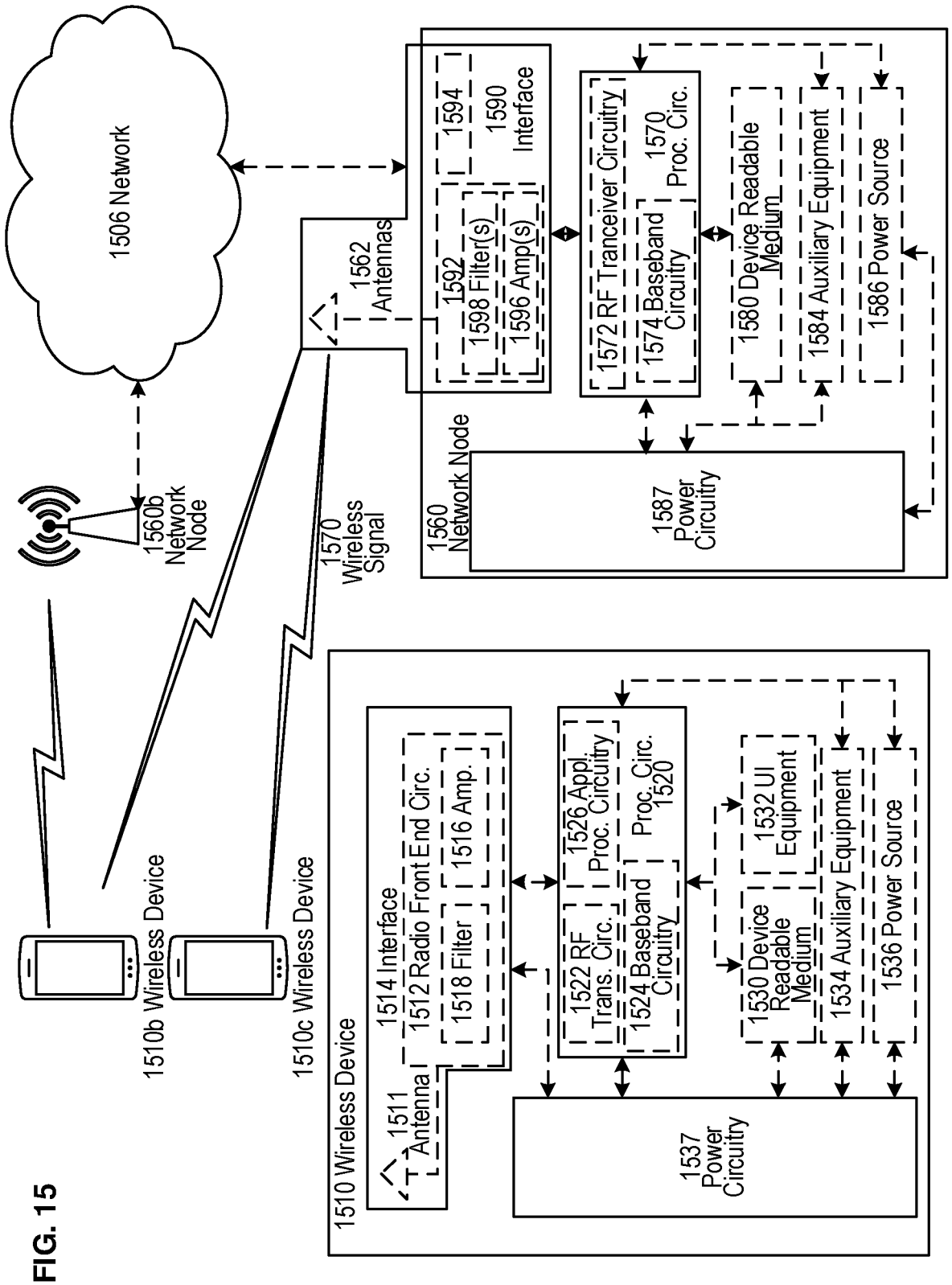
FIG. 15 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network can further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1560 are depicted as single boxes located within a larger box, or nested within multiple boxes, in practice, a network node can comprise multiple different physical components that make up a single illustrated component (e.g., device readable medium 1580 can comprise multiple separate hard drives as well as multiple RAM modules).

Similarly, network node 1560 can be composed of multiple physically separate components (e.g., a NodeB component and a RNC component, or a BTS component and a BSC component, etc.), which can each have their own respective components. In certain scenarios in which network node 1560 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1560 can be configured to support multiple radio access technologies (RATs). In such embodiments, some components can be duplicated (e.g., separate device readable medium 1580 for the different RATs) and some components can be reused (e.g., the same antenna 1562 can be shared by the RATs). Network node 1560 can also include multiple sets of the various illustrated components for different wireless technologies integrated into network node 1560, such as, for example, GSM, WCDMA, LTE, NR, WiFi, or Bluetooth wireless technologies. These wireless technologies can be integrated into the same or different chip or set of chips and other components within network node 1560.

Processing circuitry 1570 can be configured to perform any determining, calculating, or similar operations (e.g., certain obtaining operations) described herein as being provided by a network node. These operations performed by processing circuitry 1570 can include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1560, either alone or in conjunction with other network node 1560 components (e.g., device readable medium 1580). Such functionality can include any of the various wireless features, functions, or benefits discussed herein.

For example, processing circuitry 1570 can execute instructions stored in device readable medium 1580 or in memory within processing circuitry 1570. In some embodiments, processing circuitry 1570 can include a system on a chip (SOC). As a more specific example, instructions (also referred to as a computer program product) stored in medium 1580 can include instructions that, when executed by processing circuitry 1570, can configure network node 1560 to perform operations corresponding to various exemplary methods (e.g., procedures) described herein.

In some embodiments, processing circuitry 1570 can include one or more of radio frequency (RF) transceiver circuitry 1572 and baseband processing circuitry 1574. In some embodiments, radio frequency (RF) transceiver circuitry 1572 and baseband processing circuitry 1574 can be on separate chips (or sets of chips), boards, or units, such as radio units and digital units. In alternative embodiments, part or all of RF transceiver circuitry 1572 and baseband processing circuitry 1574 can be on the same chip or set of chips, boards, or units In certain embodiments, some or all of the functionality described herein as being provided by a network node, base station, eNB or other such network device can be performed by processing circuitry 1570 executing instructions stored on device readable medium 1580 or memory within processing circuitry 1570. In alternative embodiments, some or all of the functionality can be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560 but are enjoyed by network node 1560 as a whole, and/or by end users and the wireless network generally.

Device readable medium 1580 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1570. Device readable medium 1580 can store any suitable instructions, data or information, including a computer program, software, an application including one or more of logic, rules, code, tables, etc. and/or other instructions capable of being executed by processing circuitry 1570 and, utilized by network node 1560. Device readable medium 1580 can be used to store any calculations made by processing circuitry 1570 and/or any data received via interface 1590. In some embodiments, processing circuitry 1570 and device readable medium 1580 can be considered to be integrated.

Interface 1590 is used in the wired or wireless communication of signaling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that can be coupled to, or in certain embodiments a part of, antenna 1562. Radio front end circuitry 1592 comprises filters 1598 and amplifiers 1596. Radio front end circuitry 1592 can be connected to antenna 1562 and processing circuitry 1570. Radio front end circuitry can be configured to condition signals communicated between antenna 1562 and processing circuitry 1570. Radio front end circuitry 1592 can receive digital data that is to be sent out to other network nodes or WDs via a wireless connection. Radio front end circuitry 1592 can convert the digital data into a radio signal having the appropriate channel and bandwidth parameters using a combination of filters 1598 and/or amplifiers 1596. The radio signal can then be transmitted via antenna 1562. Similarly, when receiving data, antenna 1562 can collect radio signals which are then converted into digital data by radio front end circuitry 1592. The digital data can be passed to processing circuitry 1570. In other embodiments, the interface can comprise different components and/or different combinations of components.

In certain alternative embodiments, network node 1560 may not include separate radio front end circuitry 1592, instead, processing circuitry 1570 can comprise radio front end circuitry and can be connected to antenna 1562 without separate radio front end circuitry 1592. Similarly, in some embodiments, all or some of RF transceiver circuitry 1572 can be considered a part of interface 1590. In still other embodiments, interface 1590 can include one or more ports or to terminals 1594, radio front end circuitry 1592, and RF transceiver circuitry 1572, as part of a radio unit (not shown), and interface 1590 can communicate with baseband processing circuitry 1574, which is part of a digital unit (not shown).

Antenna 1562 can include one or more antennas, or antenna arrays, configured to send and/or receive wireless signals. Antenna 1562 can be coupled to radio front end circuitry 1590 and can be any type of antenna capable of transmitting and receiving data and/or signals wirelessly. In some embodiments, antenna 1562 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1562 can be separate from network node 1560 and can be connectable to network node 1560 through an interface or port.

Antenna 1562, interface 1590, and/or processing circuitry 1570 can be configured to perform any receiving operations and/or certain obtaining operations described herein as being performed by a network node. Any information, data and/or signals can be received from a wireless device, another network node and/or any other network equipment. Similarly, antenna 1562, interface 1590, and/or processing circuitry 1570 can be configured to perform any transmitting operations described herein as being performed by a network node. Any information, data and/or signals can be transmitted to a wireless device, another network node and/or any other network equipment.

Power circuitry 1587 can comprise, or be coupled to, power management circuitry and can be configured to supply the components of network node 1560 with power for performing the functionality described herein. Power circuitry 1587 can receive power from power source 1586. Power source 1586 and/or power circuitry 1587 can be configured to provide power to the various components of network node 1560 in a form suitable for the respective components (e.g., at a voltage and current level needed for each respective component). Power source 1586 can either be included in, or external to, power circuitry 1587 and/or network node 1560. For example, network node 1560 can be connectable to an external power source (e.g., an electricity outlet) via an input circuitry or interface such as an electrical cable, whereby the external power source supplies power to power circuitry 1587. As a further example, power source 1586 can comprise a source of power in the form of a battery or battery pack which is connected to, or integrated in, power circuitry 1587. The battery can provide backup power should the external power source fail. Other types of power sources, such as photovoltaic devices, can also be used.

Alternative embodiments of network node 1560 can include additional components beyond those shown in FIG. 15 that can be responsible for providing certain aspects of the network node's functionality, including any of the functionality described herein and/or any functionality necessary to support the subject matter described herein. For example, network node 1560 can include user interface equipment to allow and/or facilitate input of information into network node 1560 and to allow and/or facilitate output of information from network node 1560. This can allow and/or facilitate a user to perform diagnostic, maintenance, repair, and other administrative functions for network node 1560.

In some embodiments, a wireless device (WD, e.g., WD 1510) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 can include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies can be integrated into the same or different chips or set of chips as other components within WD 1510.

Antenna 1511 can include one or more antennas or antenna arrays, configured to send and/or receive wireless signals, and is connected to interface 1514. In certain alternative embodiments, antenna 1511 can be separate from WD 1510 and be connectable to WD 1510 through an interface or port. Antenna 1511, interface 1514, and/or processing circuitry 1520 can be configured to perform any receiving or transmitting operations described herein as being performed by a WD. Any information, data and/or signals can be received from a network node and/or another WD. In some embodiments, radio front end circuitry and/or antenna 1511 can be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520 and can be configured to condition signals communicated between antenna 1511 and processing circuitry 1520. Radio front end circuitry 1512 can be coupled to or a part of antenna 1511. In some embodiments, WD 1510 may not include separate radio front end circuitry 1512; rather, processing circuitry 1520 can comprise radio front end circuitry and can be connected to antenna 1511. Similarly, in some embodiments, some or all of RF transceiver circuitry 1522 can be considered a part of interface 1514. Radio front end circuitry 1512 can receive digital data that is to be sent out to other network nodes or WDs via a wireless connection. Radio front end circuitry 1512 can convert the digital data into a radio signal having the appropriate channel and bandwidth parameters using a combination of filters 1518 and/or amplifiers 1516. The radio signal can then be transmitted via antenna 1511. Similarly, when receiving data, antenna 1511 can collect radio signals which are then converted into digital data by radio front end circuitry 1512. The digital data can be passed to processing circuitry 1520. In other embodiments, the interface can comprise different components and/or different combinations of components.

Processing circuitry 1520 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1510 functionality either alone or in combination with other WD 1510 components, such as device readable medium 1530. Such functionality can include any of the various wireless features or benefits discussed herein.

For example, processing circuitry 1520 can execute instructions stored in device readable medium 1530 or in memory within processing circuitry 1520 to provide the functionality disclosed herein. More specifically, instructions (also referred to as a computer program product) stored in medium 1530 can include instructions that, when executed by processor 1520, can configure wireless device 1510 to perform operations corresponding to various exemplary methods (e.g., procedures) described herein.

As illustrated, processing circuitry 1520 includes one or more of RF transceiver circuitry 1522, baseband processing circuitry 1524, and application processing circuitry 1526. In other embodiments, the processing circuitry can comprise different components and/or different combinations of components. In certain embodiments processing circuitry 1520 of WD 1510 can comprise a SOC. In some embodiments, RF transceiver circuitry 1522, baseband processing circuitry 1524, and application processing circuitry 1526 can be on separate chips or sets of chips. In alternative embodiments, part or all of baseband processing circuitry 1524 and application processing circuitry 1526 can be combined into one chip or set of chips, and RF transceiver circuitry 1522 can be on a separate chip or set of chips. In still alternative embodiments, part or all of RF transceiver circuitry 1522 and baseband processing circuitry 1524 can be on the same chip or set of chips, and application processing circuitry 1526 can be on a separate chip or set of chips. In yet other alternative embodiments, part or all of RF transceiver circuitry 1522, baseband processing circuitry 1524, and application processing circuitry 1526 can be combined in the same chip or set of chips. In some embodiments, RF transceiver circuitry 1522 can be a part of interface 1514. RF transceiver circuitry 1522 can condition RF signals for processing circuitry 1520.

In certain embodiments, some or all of the functionality described herein as being performed by a WD can be provided by processing circuitry 1520 executing instructions stored on device readable medium 1530, which in certain embodiments can be a computer-readable storage medium. In alternative embodiments, some or all of the functionality can be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 can be configured to perform any determining, calculating, or similar operations (e.g., certain obtaining operations) described herein as being performed by a WD. These operations, as performed by processing circuitry 1520, can include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 can be operable to store a computer program, software, an application including one or more of logic, rules, code, tables, etc. and/or other instructions capable of being executed by processing circuitry 1520. Device readable medium 1530 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1520. In some embodiments, processing circuitry 1520 and device readable medium 1530 can be considered to be integrated.

User interface equipment 1532 can include components that allow and/or facilitate a human user to interact with WD 1510. Such interaction can be of many forms, such as visual, audial, tactile, etc. User interface equipment 1532 can be operable to produce output to the user and to allow and/or facilitate the user to provide input to WD 1510. The type of interaction can vary depending on the type of user interface equipment 1532 installed in WD 1510. For example, if WD 1510 is a smart phone, the interaction can be via a touch screen; if WD 1510 is a smart meter, the interaction can be through a screen that provides usage (e.g., the number of gallons used) or a speaker that provides an audible alert (e.g., if smoke is detected). User interface equipment 1532 can include input interfaces, devices and circuits, and output interfaces, devices and circuits. User interface equipment 1532 can be configured to allow and/or facilitate input of information into WD 1510 and is connected to processing circuitry 1520 to allow and/or facilitate processing circuitry 1520 to process the input information. User interface equipment 1532 can include, for example, a microphone, a proximity or other sensor, keys/buttons, a touch display, one or more cameras, a USB port, or other input circuitry. User interface equipment 1532 is also configured to allow and/or facilitate output of information from WD 1510, and to allow and/or facilitate processing circuitry 1520 to output information from WD 1510. User interface equipment 1532 can include, for example, a speaker, a display, vibrating circuitry, a USB port, a headphone interface, or other output circuitry. Using one or more input and output interfaces, devices, and circuits, of user interface equipment 1532, WD 1510 can communicate with end users and/or the wireless network and allow and/or facilitate them to benefit from the functionality described herein.

Auxiliary equipment 1534 is operable to provide more specific functionality which may not be generally performed by WDs. This can comprise specialized sensors for doing measurements for various purposes, interfaces for additional types of communication such as wired communications etc. The inclusion and type of components of auxiliary equipment 1534 can vary depending on the embodiment and/or scenario.

Power source 1536 can, in some embodiments, be in the form of a battery or battery pack. Other types of power sources, such as an external power source (e.g., an electricity outlet), photovoltaic devices or power cells, can also be used. WD 1510 can further comprise power circuitry 1537 for delivering power from power source 1536 to the various parts of WD 1510 which need power from power source 1536 to carry out any functionality described or indicated herein. Power circuitry 1537 can in certain embodiments comprise power management circuitry. Power circuitry 1537 can additionally or alternatively be operable to receive power from an external power source; in which case WD 1510 can be connectable to the external power source (such as an electricity outlet) via input circuitry or an interface such as an electrical power cable. Power circuitry 1537 can also in certain embodiments be operable to deliver power from an external power source to power source 1536. This can be, for example, for the charging of power source 1536. Power circuitry 1537 can perform any converting or other modification to the power from power source 1536 to make it suitable for supply to the respective components of WD 1510.

Figure 16:
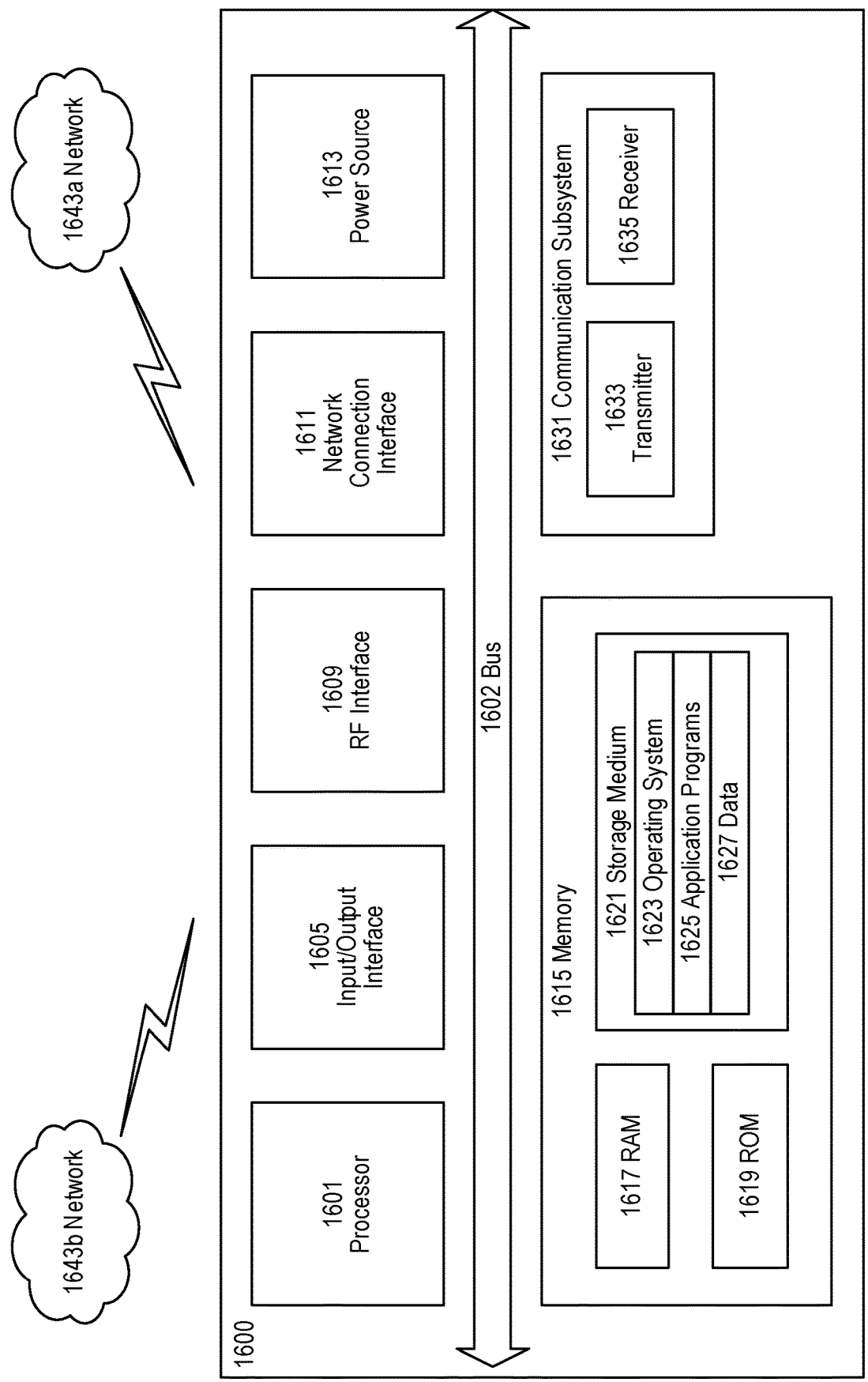
FIG. 16 illustrates an exemplary embodiment of a UE, in accordance with various aspects described herein.

FIG. 16 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 16200 can be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 can include other similar types of information. Certain UEs can utilize all of the components shown in FIG. 16, or only a subset of the components. The level of integration between the components can vary from one UE to another UE. Further, certain UEs can contain multiple instances of a component, such as multiple processors, memories, transceivers, transmitters, receivers, etc.

In FIG. 16, processing circuitry 1601 can be configured to process computer instructions and data. Processing circuitry 1601 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 can include two central processing units (CPUs). Data can be information in a form suitable for use by a computer.

In the depicted embodiment, input/output interface 1605 can be configured to provide a communication interface to an input device, output device, or input and output device. UE 1600 can be configured to use an output device via input/output interface 1605. An output device can use the same type of interface port as an input device. For example, a USB port can be used to provide input to and output from UE 1600. The output device can be a speaker, a sound card, a video card, a display, a monitor, a printer, an actuator, an emitter, a smartcard, another output device, or any combination thereof. UE 1600 can be configured to use an input device via input/output interface 1605 to allow and/or facilitate a user to capture information into UE 1600. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 16, RF interface 1609 can be configured to provide a communication interface to RF components such as a transmitter, a receiver, and an antenna. Network connection interface 1611 can be configured to provide a communication interface to network 1643*a*. Network 1643*a* can encompass wired and/or wireless networks such as a local-area network (LAN), a wide-area network (WAN), a computer network, a wireless network, a telecommunications network, another like network or any combination thereof. For example, network 1643*a* can comprise a Wi-Fi network. Network connection interface 1611 can be configured to include a receiver and a transmitter interface used to communicate with one or more other devices over a communication network according to one or more communication protocols, such as Ethernet, TCP/IP, SONET, ATM, or the like. Network connection interface 1611 can implement receiver and transmitter functionality appropriate to the communication network links (e.g., optical, electrical, and the like). The transmitter and receiver functions can share circuit components, software or firmware, or alternatively can be implemented separately.

RAM 1617 can be configured to interface via bus 1602 to processing circuitry 1601 to provide storage or caching of data or computer instructions during the execution of software programs such as the operating system, application programs, and device drivers. ROM 1619 can be configured to provide computer instructions or data to processing circuitry 1601. For example, ROM 1619 can be configured to store invariant low-level system code or data for basic system functions such as basic input and output (I/O), startup, or reception of keystrokes from a keyboard that are stored in a non-volatile memory. Storage medium 1621 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1621 can be configured to include operating system 1623; application program 1625 such as a web browser application, a widget or gadget engine or another application; and data file 1627. Storage medium 1621 can store, for use by UE 1600, any of a variety of various operating systems or combinations of operating systems. For example, application program 1625 can include executable program instructions (also referred to as a computer program product) that, when executed by processor 1601, can configure UE 1600 to perform operations corresponding to various exemplary methods (e.g., procedures) described herein.

Storage medium 1621 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 can allow and/or facilitate UE 1600 to access computer-executable instructions, application programs or the like, stored on transitory or non-transitory memory media, to off-load data, or to upload data. An article of manufacture, such as one utilizing a communication system can be tangibly embodied in storage medium 1621, which can comprise a device readable medium.

In FIG. 16, processing circuitry 1601 can be configured to communicate with network 1643*b* using communication subsystem 1631. Network 1643*a* and network 1643*b* can be the same network or networks or different network or networks. Communication subsystem 1631 can be configured to include one or more transceivers used to communicate with network 1643*b*. For example, communication subsystem 1631 can be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver can include transmitter 1633 and/or receiver 1635 to implement transmitter or receiver functionality, respectively, appropriate to the RAN links (e.g., frequency allocations and the like). Further, transmitter 1633 and receiver 1635 of each transceiver can share circuit components, software or firmware, or alternatively can be implemented separately.

In the illustrated embodiment, the communication functions of communication subsystem 1631 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 can include cellular communication, Wi-Fi communication, Bluetooth communication, and GPS communication. Network 1643*b* can encompass wired and/or wireless networks such as a local-area network (LAN), a wide-area network (WAN), a computer network, a wireless network, a telecommunications network, another like network or any combination thereof. For example, network 1643*b* can be a cellular network, a Wi-Fi network, and/or a near-field network. Power source 1613 can be configured to provide alternating current (AC) or direct current (DC) power to components of UE 1600.

The features, benefits and/or functions described herein can be implemented in one of the components of UE 1600 or partitioned across multiple components of UE 1600. Further, the features, benefits, and/or functions described herein can be implemented in any combination of hardware, software or firmware. In one example, communication subsystem 1631 can be configured to include any of the components described herein. Further, processing circuitry 1601 can be configured to communicate with any of such components over bus 1602. In another example, any of such components can be represented by program instructions stored in memory that when executed by processing circuitry 1601 perform the corresponding functions described herein. In another example, the functionality of any of such components can be partitioned between processing circuitry 1601 and communication subsystem 1631. In another example, the non-computationally intensive functions of any of such components can be implemented in software or firmware and the computationally intensive functions can be implemented in hardware.

Figure 17:
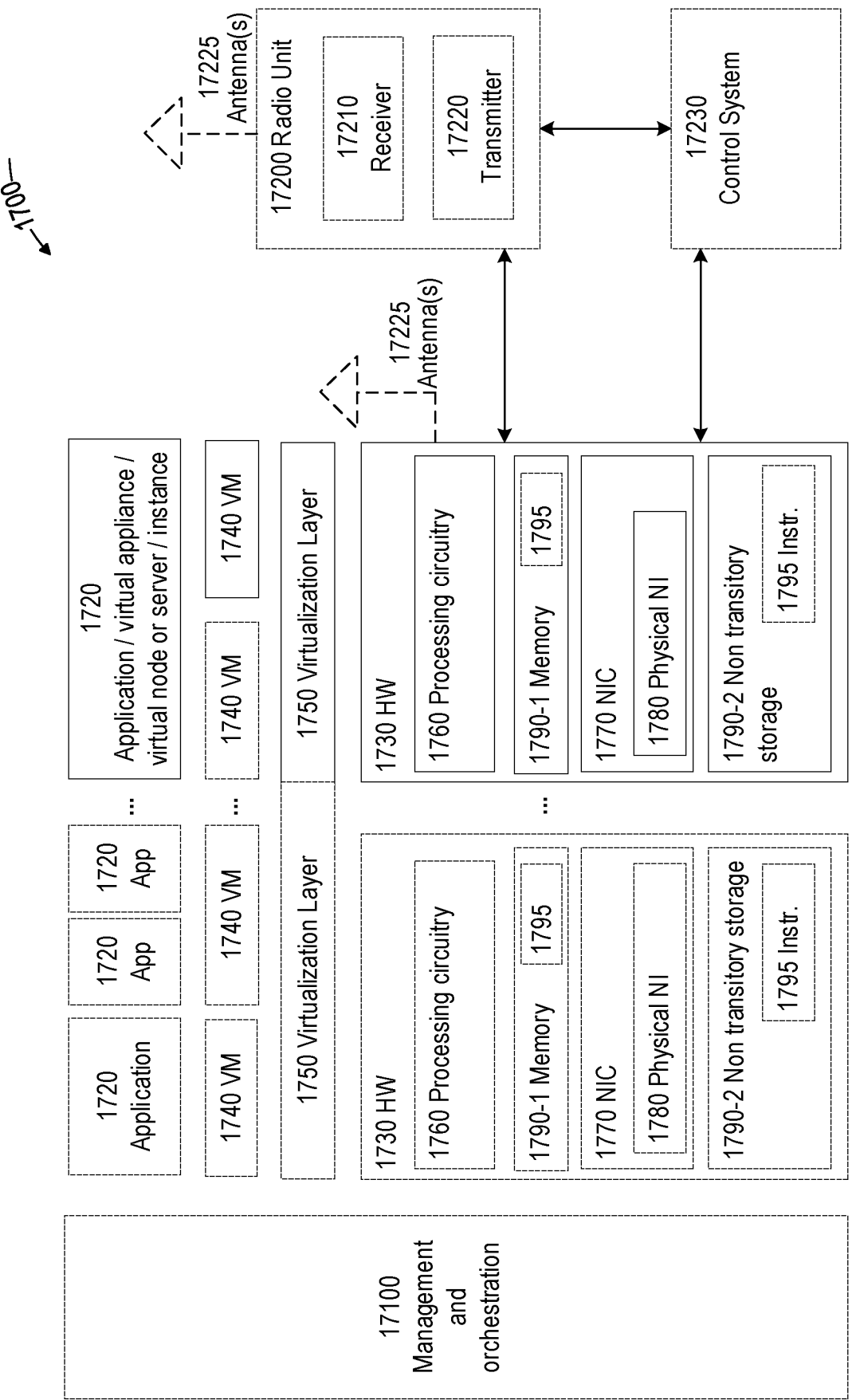
FIG. 17 is a block diagram illustrating an exemplary virtualization environment usable for implementation of various embodiments of network nodes described herein.

FIG. 17 is a schematic block diagram illustrating a virtualization environment 1700 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node can be entirely virtualized.

The functions can be implemented by one or more applications 1720 (which can alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700 can include general-purpose or special-purpose network hardware devices (or nodes) 1730 comprising a set of one or more processors or processing circuitry 1760, which can be commercial off-the-shelf (COTS) processors, dedicated Application Specific Integrated Circuits (ASICs), or any other type of processing circuitry including digital or analog hardware components or special purpose processors. Each hardware device can comprise memory 1790-1 which can be non-persistent memory for temporarily storing instructions 1795 or software executed by processing circuitry 1760. For example, instructions 1795 can include program instructions (also referred to as a computer program product) that, when executed by processing circuitry 1760, can configure hardware node 1720 to perform operations corresponding to various exemplary methods (e.g., procedures) described herein. Such operations can also be attributed to virtual node(s) 1720 that is/are hosted by hardware node 1730.

Each hardware device can comprise one or more network interface controllers (NICs) 1770, also known as network interface cards, which include physical network interface 1780. Each hardware device can also include non-transitory, persistent, machine-readable storage media 1790-2 having stored therein software 1795 and/or instructions executable by processing circuitry 1760. Software 1795 can include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and can be run by a corresponding virtualization layer 1750 or hypervisor. Different embodiments of the instance of virtual appliance 1720 can be implemented on one or more of virtual machines 1740, and the implementations can be made in different ways.

During operation, processing circuitry 1760 executes software 1795 to instantiate the hypervisor or virtualization layer 1750, which can sometimes be referred to as a virtual machine monitor (VMM). Virtualization layer 1750 can present a virtual operating platform that appears like networking hardware to virtual machine 1740.

As shown in FIG. 17, hardware 1730 can be a standalone network node with generic or specific components. Hardware 1730 can comprise antenna 17225 and can implement some functions via virtualization. Alternatively, hardware 1730 can be part of a larger cluster of hardware (e.g., such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1740 can be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 can be coupled to one or more antennas 17225. Radio units 17200 can communicate directly with hardware nodes 1730 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 17230, which can alternatively be used for communication between the hardware nodes 1730 and radio units 17200.

Figure 18:
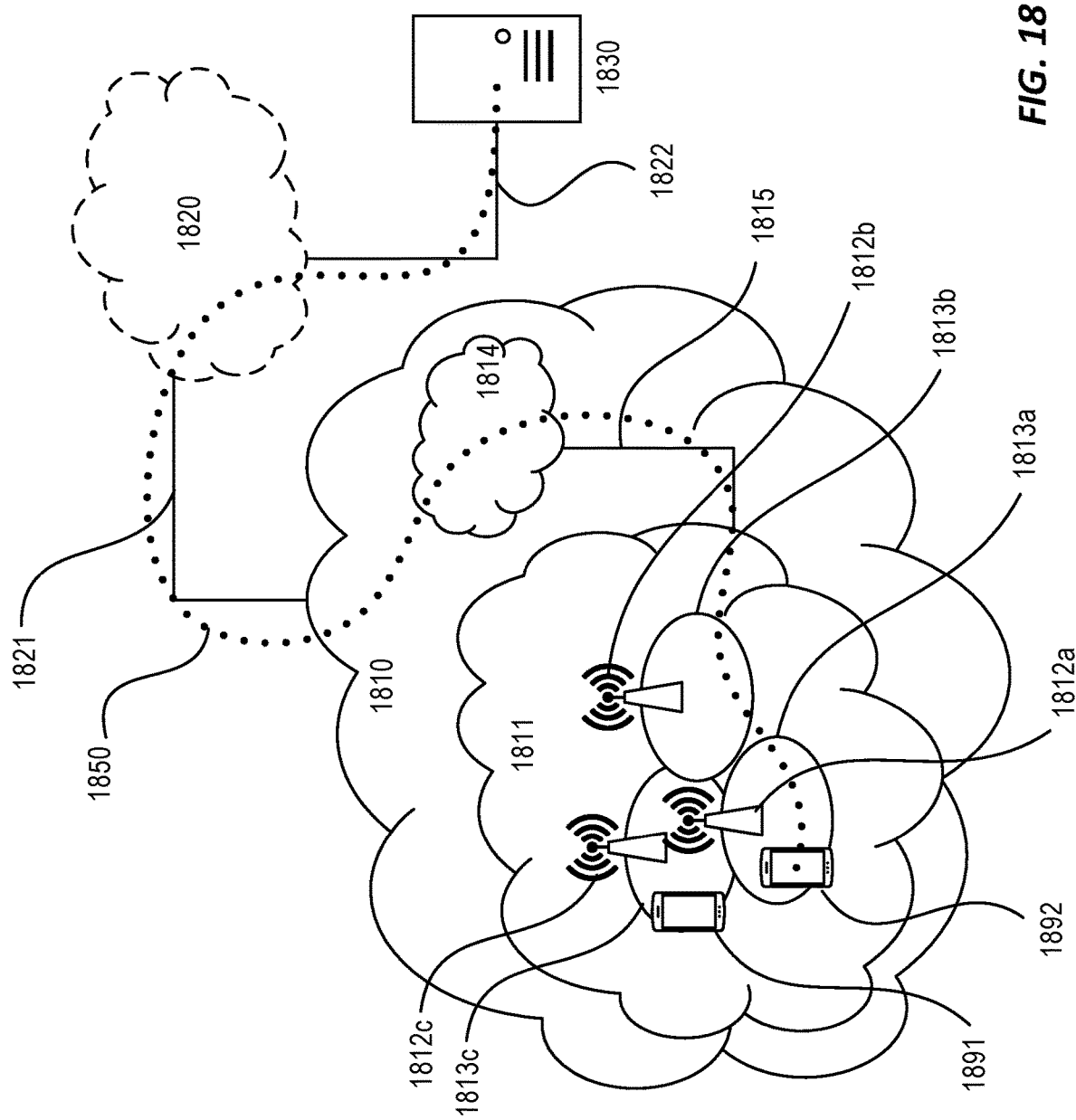
FIGS. 18-19 are block diagrams of various exemplary communication systems and/or networks, in accordance with various aspects described herein.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813*c* can be configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the Telecommunication network 1810 is itself connected to host computer 1830, which can be embodied in the hardware and/or software of a standalone server, a cloud-implemented server, a distributed server or as processing resources in a server farm. Host computer 1830 can be under the ownership or control of a service provider or can be operated by the service provider or on behalf of the service provider. Connections 1821 and 1822 between telecommunication network 1810 and host computer 1830 can extend directly from core network 1814 to host computer 1830 or can go via an optional intermediate network 1820. Intermediate network 1820 can be one of, or a combination of more than one of, a public, private or hosted network; intermediate network 1820, if any, can be a backbone network or the Internet; in particular, intermediate network 1820 can comprise two or more sub-networks (not shown).

The communication system of FIG. 18 as a whole enables connectivity between the connected UEs 1891, 1892 and host computer 1830. The connectivity can be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 can be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which can have storage and/or processing capabilities. In particular, processing circuitry 1918 can comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 can be operable to provide a service to a remote user, such as UE 1930 connecting via OTT connection 1950 terminating at UE 1930 and host computer 1910. In providing the service to the remote user, host application 1912 can provide user data which is transmitted using OTT connection 1950.

Communication system 1900 can also include base station 1920 provided in a telecommunication system and comprising hardware 1925 enabling it to communicate with host computer 1910 and with UE 1930. Hardware 1925 can include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 can be configured to facilitate connection 1960 to host computer 1910. Connection 1960 can be direct, or it can pass through a core network (not shown in FIG. 19) of the telecommunication system and/or through one or more intermediate networks outside the telecommunication system. In the embodiment shown, hardware 1925 of base station 1920 can also include processing circuitry 1928, which can comprise one or more programmable processors, application-specific integrated circuits, field programmable gate arrays or combinations of these (not shown) adapted to execute instructions.

Base station 1920 also includes software 1921 stored internally or accessible via an external connection. For example, software 1921 can include program instructions (also referred to as a computer program product) that, when executed by processing circuitry 1928, can configure base station 1920 to perform operations corresponding to various exemplary methods (e.g., procedures) described herein.

Communication system 1900 can also include UE 1930 already referred to, whose hardware 1935 can include radio interface 1937 configured to set up and maintain wireless connection 1970 with a base station serving a coverage area in which UE 1930 is currently located. Hardware 1935 of UE 1930 can also include processing circuitry 1938, which can comprise one or more programmable processors, application-specific integrated circuits, field programmable gate arrays or combinations of these (not shown) adapted to execute instructions.

UE 1930 also includes software 1931, which is stored in or accessible by UE 1930 and executable by processing circuitry 1938. Software 1931 includes client application 1932. Client application 1932 can be operable to provide a service to a human or non-human user via UE 1930, with the support of host computer 1910. In host computer 1910, an executing host application 1912 can communicate with the executing client application 1932 via OTT connection 1950 terminating at UE 1930 and host computer 1910. In providing the service to the user, client application 1932 can receive request data from host application 1912 and provide user data in response to the request data. OTT connection 1950 can transfer both the request data and the user data. Client application 1932 can interact with the user to generate the user data that it provides. Software 1931 can also include program instructions (also referred to as a computer program product) that, when executed by processing circuitry 1938, can configure UE 1930 to perform operations corresponding to various exemplary methods (e.g., procedures) described herein.

Figure 19:
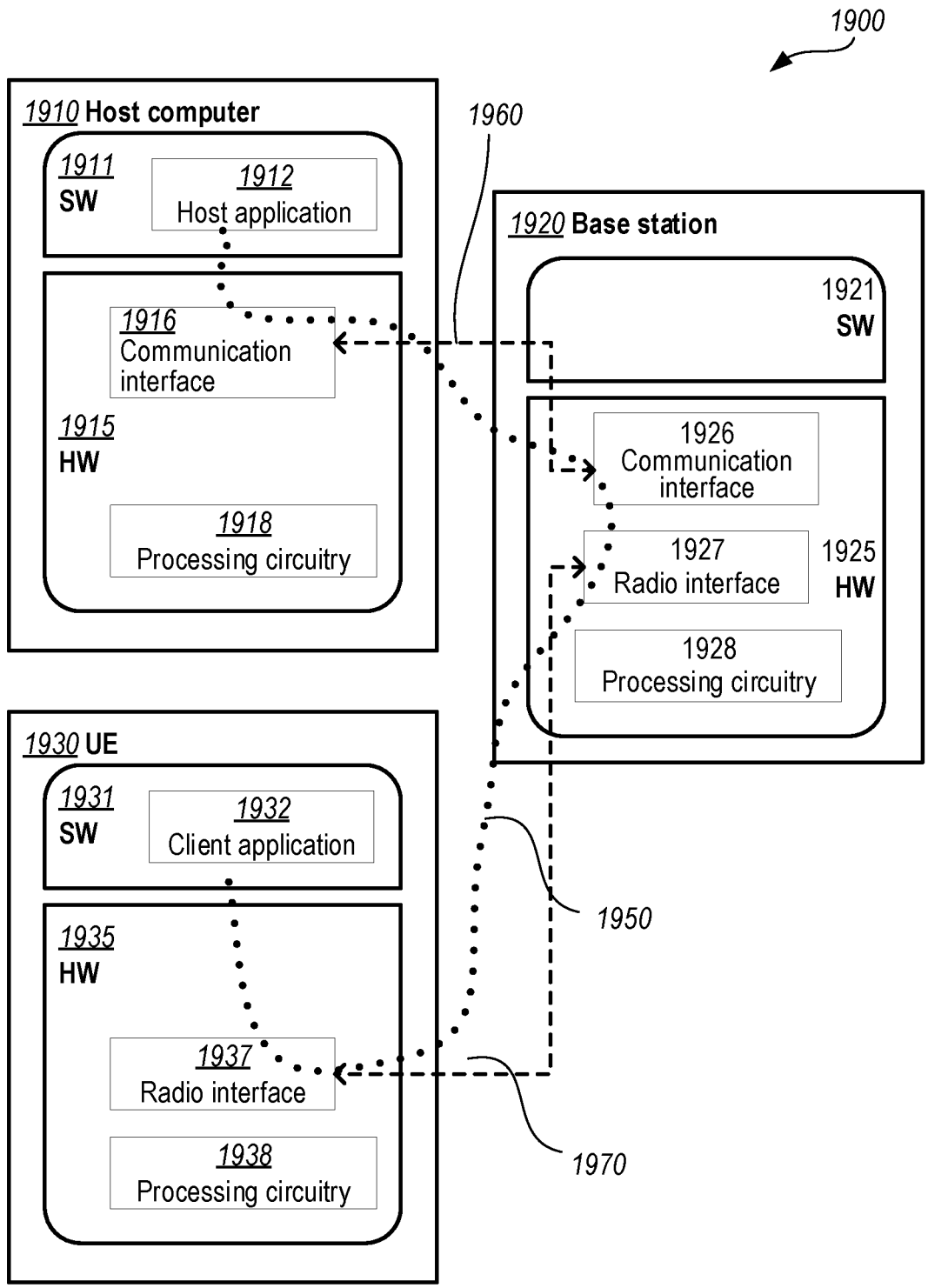

As an example, host computer 1910, base station 1920 and UE 1930 illustrated in FIG. 19 can be similar or identical to host computer 1830, one of base stations 1812*a*, 1812*b*, 1812*c* and one of UEs 1891, 1892 of FIG. 18, respectively. This is to say, the inner workings of these entities can be as shown in FIG. 19 and independently, the surrounding network topology can be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure can determine the routing, which it can be configured to hide from UE 1930 or from the service provider operating host computer 1910, or both. While OTT connection 1950 is active, the network infrastructure can further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1950 between host computer 1910 and UE 1930, in response to variations in the measurement results. The measurement procedure and/or the network functionality for reconfiguring OTT connection 1950 can be implemented in software 1911 and hardware 1915 of host computer 1910 or in software 1931 and hardware 1935 of UE 1930, or both. In embodiments, sensors (not shown) can be deployed in or in association with communication devices through which OTT connection 1950 passes; the sensors can participate in the measurement procedure by supplying values of the monitored quantities exemplified above, or supplying values of other physical quantities from which software 1911, 1931 can compute or estimate the monitored quantities. The reconfiguring of OTT connection 1950 can include message format, retransmission settings, preferred routing etc.; the reconfiguring need not affect base station 1920, and it can be unknown or imperceptible to base station 1920. Such procedures and functionalities can be known and practiced in the art. In certain embodiments, measurements can involve proprietary UE signaling facilitating host computer 1910's measurements of throughput, propagation times, latency and the like. The measurements can be implemented in that software 1911 and 1931 causes messages to be transmitted, in particular empty or 'dummy' messages, using OTT connection 1950 while it monitors propagation times, errors, etc.

Figure 20:
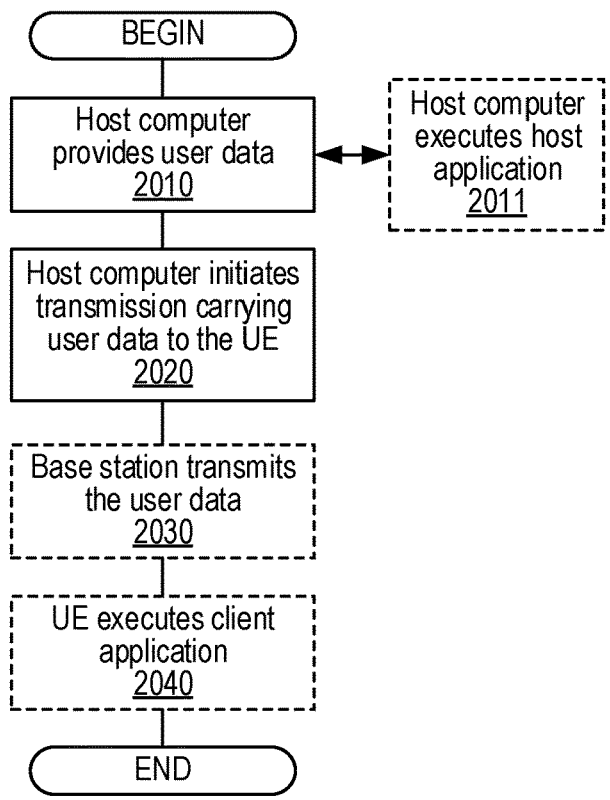
FIGS. 20-23 are flow diagrams of exemplary methods and/or procedures for transmission and/or reception of user data that can be implemented, for example, in the exemplary communication systems and/or networks illustrated in FIGS. 18-19.

FIG. 20 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 20 will be included in this section. In step 2010, the host computer provides user data. In substep 2011 (which can be optional) of step 2010, the host computer provides the user data by executing a host application. In step 2020, the host computer initiates a transmission carrying the user data to the UE. In step 2030 (which can be optional), the base station transmits to the UE the user data which was carried in the transmission that the host computer initiated, in accordance with the teachings of the embodiments described throughout this disclosure. In step 2040 (which can also be optional), the UE executes a client application associated with the host application executed by the host computer.

Figure 21:
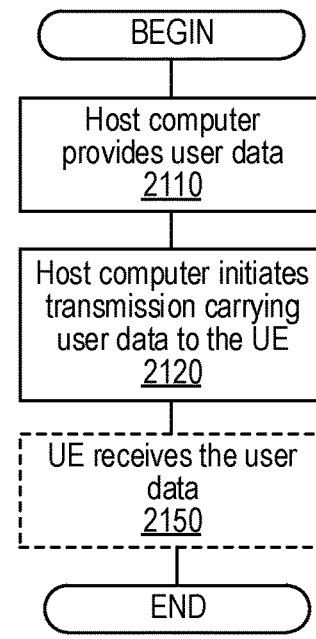

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission can pass via the base station, in accordance with the teachings of the embodiments described throughout this disclosure. In step 2130 (which can be optional), the UE receives the user data carried in the transmission.

Figure 22:
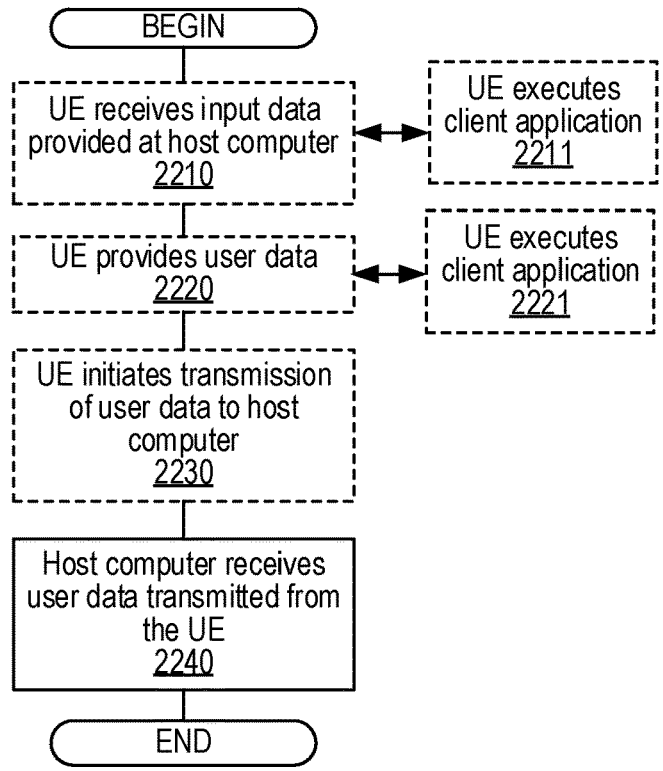

FIG. 22 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 22 will be included in this section. In step 2210 (which can be optional), the UE receives input data provided by the host computer. Additionally or alternatively, in step 2220, the UE provides user data. In substep 2221 (which can be optional) of step 2220, the UE provides the user data by executing a client application. In substep 2211 (which can be optional) of step 2210, the UE executes a client application which provides the user data in reaction to the received input data provided by the host computer. In providing the user data, the executed client application can further consider user input received from the user. Regardless of the specific manner in which the user data was provided, the UE initiates, in substep 2230 (which can be optional), transmission of the user data to the host computer. In step 2240 of the method, the host computer receives the user data transmitted from the UE, in accordance with the teachings of the embodiments described throughout this disclosure.

Figure 23:
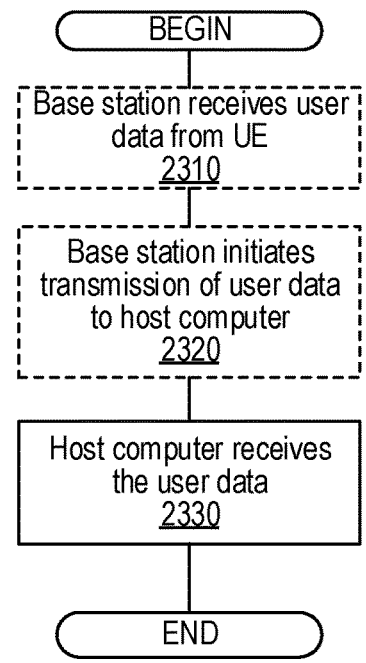

FIG. 23 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 23 will be included in this section. In step 2310 (which can be optional), in accordance with the teachings of the embodiments described throughout this disclosure, the base station receives user data from the UE. In step 2320 (which can be optional), the base station initiates transmission of the received user data to the host computer. In step 2330 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

E1. A method performed by a user equipment (UE) configured for dual connectivity (DC) with a master node (MN) providing a master cell group (MCG) that includes a primary serving cell (PCell), and with a secondary node (SN) providing a secondary cell group (SCG) that includes a primary secondary cell (PSCell), the method comprising:
 detecting a radio link problem associated with a first serving cell, wherein first serving cell is the PCell or the PSCell; and in response to detecting the radio link problem, for each of one or more of the UE's split radio bearers that have primary paths set to a first cell group including the first serving cell, performing a recovery procedure such that all uplink (UL) data transmission for the split radio bearer occurs only via a secondary path that does not include the first serving cell.

E2. The method of embodiment E1, further comprising, for each of the UE's split radio bearers that was subject to the recovery procedure, performing a restoration procedure such that UL data transmission for the split radio bearer occurs via both the primary path and the secondary path.

E3. The method of embodiment E2, wherein performing the restoration procedure is in response to one of the following:
  detecting that the radio link problem has ended; or
  receiving a reconfiguration message from a network node.

E4. The method of any of embodiments E1-E3, wherein performing the recovery procedure for each of the split radio bearers comprises setting the primary path to a second cell group that does not include the first serving cell.

E5. The method of any of embodiments E2-E4, wherein performing the restoration procedure for each of the split radio bearers comprises setting the primary path to the first cell group or to a further cell group.

E6. The method of any of embodiments E1-E3, wherein performing the recovery procedure for each of the split radio bearers comprises:
  storing a currently configured value for an UL data threshold parameter in a local variable; and
  setting the UL data threshold parameter to a value that requires the UE to request UL grants only from a second cell group that does not include the first serving cell.

E7. The method of any of embodiments E2-E3 and E6, wherein performing the restoration procedure for each of the split radio bearers comprises restoring the value stored in the local variable to the UL data threshold parameter.

E8. The method of any of embodiments E1-E7, wherein:
  the radio link problem is a radio link failure (RLF) associated with the PCell; and
  detecting the radio link problem comprises detecting one or more of the following:
    timer T310 expiry in the PCell;
    indication of random access problem from the UE's MCG medium access control (MAC) layer while none of timers T300, T301, T304, T311 and T319 is running; and
    indication from the UE's MCG radio link control (RLC) layer that a maximum number of retransmissions has been reached.

E9. The method of any of embodiments E1-E7, wherein:
  the radio link problem is a physical layer (PHY) problem associated with the PCell; and
  detecting the radio link problem comprises receiving N310 consecutive out-Eof-Esync (OOS) indications for the PCell from the UE PHY.

E10. The method of any of embodiments E1-E7, wherein:
  the radio link problem is a radio link failure (RLF) associated with the PSCell; and
  detecting the radio link problem comprises detecting one or more of the following:
    expiry of timer T310 in a New Radio (NR) PSCell;
    expiry of timer T313 in an LTE PSCell;
    indication from the UE's SCG radio link control (RLC) layer that a maximum number of retransmissions has been reached;
    SCG reconfiguration-Ewith-Esync failure;
    SCG change failure;
    SCG configuration failure;
    integrity check failure for a signaling radio bearer (SRB); and
    stopping the UE's UL transmission due to exceeding a maximum UL transmission timing difference.

E11. The method of any of embodiments E1-E7, wherein:
  the radio link problem is a physical layer (PHY) problem associated with the PSCell; and
  detecting the radio link problem comprises receiving one of the following:
    N310 consecutive out-Eof-Esync (OOS) indications for a New Radio (NR) PSCell; or
    N313 consecutive OOS indications for an LTE PSCell.

E12. The method of any of embodiments E1-E11, further comprising receiving, from the MN, an indication of whether the UE should perform the recovery procedure in response to detecting the radio link problem, wherein the recovery procedure is performed selectively based on the indication.

E13. The method of embodiment E12, wherein:
  the received indication comprises respective indications associated with respective split radio bearers; and
  the recovery procedure is performed selectively for the respective split radio bearers based on the respective indications.

E14. The method of any of embodiments E1-E13, further comprising sending, to the MN, an indication of the radio link problem associated with the first serving cell.

E15. A method performed by network node configured for dual-Econnectivity (DC) with a user equipment (UE) via a master cell group (MCG) that includes a primary serving cell (PCell) or via a secondary cell group (SCG) that includes a primary secondary cell (PSCell), the method comprising:
  receiving, from the UE, an indication of a radio link problem associated with a first serving cell, wherein the first serving cell is the PCell or the PSCell and is part of a first cell group provided by the network node; and
  in response to receiving the indication, sending, to a target network node, a handover preparation information message that includes:
    a first indication of a UE handover due to a radio link problem in the first cell group, and
    a second indication that the UE has performed a recovery procedure for one or more split radio bearers such that all uplink (UL) data transmission for the one or more split radio bearers occurs only via a secondary path that does not include the first serving cell.

E16. The method of embodiment E15, wherein the second indication indicates that, for each of the split radio bearers, the UE has set the primary path to a second cell group that does not include the first serving cell.

E17. The method of embodiment E15, wherein the second indication indicates that, for each of the split radio bearers, the UE has:
  stored a currently configured value for an UL data threshold parameter in a local variable; and
  set the UL data threshold parameter to a value that requires the UE to request UL grants only from a second cell group that does not include the first serving cell.

E18. The method of any of embodiments E15-E17, wherein the radio link problem is one of the following:
- a radio link failure (RLF) associated with the PCell;
- a physical layer (PHY) problem associated with the PCell;
- a radio link failure (RLF) associated with the PSCell; or
- a physical layer (PHY) problem associated with the PSCell.

E19. The method of any of embodiments E15-E18, further comprising sending, to the UE, an indication of whether the UE should perform the recovery procedure in response to detecting the radio link problem.

E20. The method of embodiment E12, wherein the indication comprises respective indications associated with respective split radio bearers.

E21. A method performed by a target network node for a user equipment (UE) configured in dual-Econnectivity (DC) via a master cell group (MCG) that includes a primary serving cell (PCell) and a secondary cell group (SCG) that includes a primary secondary cell (PSCell), the method comprising:
- receiving, from a network node, a handover preparation information message that includes:
  - a first indication of a UE handover due to a radio link problem in a first cell group, provided by the network node, that includes a first serving cell, wherein the first serving cell is the PCell or the PSCell; and
  - a second indication that the UE has performed a recovery procedure for one or more split radio bearers such that all uplink (UL) data transmission for the one or more split radio bearers occurs only via a secondary path that does not include the first serving cell; and
- in response to the second indication, performing a restoration procedure for each of the split radio bearers that was subject to the recovery procedure.

E22. The method of embodiment E21, further comprising, in response to the first indication, performing a handover of the UE from the first serving cell to a first target cell in a target cell group provide by the target network node.

E23. The method of embodiment E22, wherein performing the restoration procedure comprises sending, to the UE a reconfiguration message that indicates the UE should perform a restoration procedure such that UL data transmission for each of the split radio bearers occurs via both the secondary path and a primary path that includes the first target cell.

E24. The method of embodiment E23, wherein:
- the second indication indicates that, for each of the split radio bearers, the UE has set the primary path to a second cell group that does not include the first serving cell; and
- the reconfiguration message indicates that, for each of the split radio bearers, the UE should set the primary path to a first target cell group that includes the first target cell.

E25. The method of embodiment E23, wherein:
- the second indication indicates that the UE has, for each of the split radio bearers:
  - stored a currently configured value for an UL data threshold parameter in a local variable, and
  - set the UL data threshold parameter to a value that requires the UE to request UL grants only from a second cell group that does not include the first serving cell; and
- the reconfiguration message indicates that, for each of the split radio bearers, the UE should restore the value stored in the local variable to the UL data threshold parameter.

E26. The method of any of embodiments E21-E25, wherein the recovery procedure is associated with one of the following:
- a radio link failure (RLF) associated with the PCell;
- a physical layer (PHY) problem associated with the PCell;
- a radio link failure (RLF) associated with the PSCell; or
- a physical layer (PHY) problem associated with the PSCell.

E27. A user equipment (UE) configured for dual connectivity (DC) with a master node (MN) providing a master cell group (MCG) that includes a primary serving cell (PCell), and with a secondary node (SN) providing a secondary cell group (SCG) that includes a primary secondary cell (PSCell), the UE comprising:
- radio interface circuitry configured to communicate with the MN via at least the PCell and the SN via at least the PSCell; and
- processing circuitry operably coupled to the radio interface circuitry, whereby the processing circuitry and the radio interface circuitry are configured to perform operations corresponding to any of the methods of embodiments E1-E14.

E28. A user equipment (UE) configured for dual connectivity (DC) with a master node (MN) providing a master cell group (MCG) that includes a primary serving cell (PCell), and with a secondary node (SN) providing a secondary cell group (SCG) that includes a primary secondary cell (PSCell), the UE being further arranged to perform operations corresponding to any of the methods of embodiments E1-E14.

E29. A non-transitory, computer-readable medium storing program instructions that, when executed by processing circuitry of a user equipment (UE) configured for dual connectivity (DC) with a master node (MN) providing a master cell group (MCG) that includes a primary serving cell (PCell), and with a secondary node (SN) providing a secondary cell group (SCG) that includes a primary secondary cell (PSCell), configure the UE to perform operations corresponding to any of the methods of embodiments E1-E14.

E30. A computer program product comprising program instructions that, when executed by processing circuitry of a user equipment (UE) configured for dual connectivity (DC) with a master node (MN) providing a master cell group (MCG) that includes a primary serving cell (PCell), and with a secondary node (SN) providing a secondary cell group (SCG) that includes a primary secondary cell (PSCell), configure the UE to perform operations corresponding to any of the methods of embodiments E1-E14.

E31. A network node configured for dual-Econnectivity (DC) with a user equipment (UE) via a master cell group (MCG) that includes a primary serving cell (PCell) or via a secondary cell group (SCG) that includes a primary secondary cell (PSCell), the network node comprising:
- communication interface circuitry configured to communicate with the UE and with one or more other network nodes; and
- processing circuitry operably coupled with the communication interface circuitry, whereby the processing circuitry and the communication interface circuitry are configured to perform operations corresponding to any of the methods of embodiments E15-E20.

E32. A network node configured for dual-Econnectivity (DC) with a user equipment (UE) via a master cell group (MCG) that includes a primary serving cell (PCell) or via a secondary cell group (SCG) that includes a primary secondary cell (PSCell), the network node being further arranged to perform operations corresponding to any of the methods of embodiments E15-E20.

E33. A non-transitory, computer-readable medium storing program instructions that, when executed by processing circuitry of a network node configured for dual-Econnectivity (DC) with a user equipment (UE) via a master cell group (MCG) that includes a primary serving cell (PCell) or via a secondary cell group (SCG) that includes a primary secondary cell (PSCell), configure the network node to perform operations corresponding to any of the methods of embodiments E15-E20.

E34. A computer program product comprising program instructions that, when executed by processing circuitry of a network node configured for dual-Econnectivity (DC) with a user equipment (UE) via a master cell group (MCG) that includes a primary serving cell (PCell) or via a secondary cell group (SCG) that includes a primary secondary cell (PSCell), configure the network node to perform operations corresponding to any of the methods of embodiments E15-E20.

E35. A target network node for a user equipment (UE) configured in dual-Econnectivity (DC) via a master cell group (MCG) that includes a primary serving cell (PCell) and a secondary cell group (SCG) that includes a primary secondary cell (PSCell), the target network node comprising:
communication interface circuitry configured to communicate with the UE and with one or more other network nodes; and
processing circuitry operably coupled with the communication interface circuitry, whereby the processing circuitry and the communication interface circuitry are configured to perform operations corresponding to any of the methods of embodiments E21-E26.

E36. A target network node for a user equipment (UE) configured in dual-Econnectivity (DC) via a master cell group (MCG) that includes a primary serving cell (PCell) and a secondary cell group (SCG) that includes a primary secondary cell (PSCell), the target network node being further arranged to perform operations corresponding to any of the methods of embodiments E21-E26.

E37. A non-transitory, computer-readable medium storing program instructions that, when executed by processing circuitry of a target network node for a user equipment (UE) configured in dual-Econnectivity (DC) via a master cell group (MCG) that includes a primary serving cell (PCell) and a secondary cell group (SCG) that includes a primary secondary cell (PSCell), configure the target network node to perform operations corresponding to any of the methods of embodiments E21-E26.

E38. A computer program product comprising program instructions that, when executed by processing circuitry of a target network node for a user equipment (UE) configured in dual-Econnectivity (DC) via a master cell group (MCG) that includes a primary serving cell (PCell) and a secondary cell group (SCG) that includes a primary secondary cell (PSCell), configure the target network node to perform operations corresponding to any of the methods of embodiments E21-E26.

The invention claimed is:

1. A method performed by a user equipment (UE) configured for dual connectivity with a master node (MN) providing a master cell group that includes a primary serving cell (PCell) and with a secondary node (SN) providing a secondary cell group that includes a primary secondary cell (PSCell), the method comprising:
detecting a radio link problem associated with a first serving cell, wherein first serving cell is the PCell or the PSCell; and
in response to detecting the radio link problem, for each of the UE's split radio bearers that has a primary path set to a first cell group that includes the first serving cell, performing a recovery procedure such that all uplink (UL) data transmission for the split radio bearer occurs only via a secondary path that does not include the first serving cell.

2. The method of claim 1, further comprising, for each of the UE's split radio bearers that was subject to the recovery procedure, performing a restoration procedure such that UL data transmission for the split radio bearer occurs via both the primary path and the secondary path.

3. The method of claim 2, wherein one or more of the following applies:
performing the restoration procedure is in response to one of the following: detecting that the radio link problem has ended, or receiving a reconfiguration message from a network node; and
performing the recovery procedure for each of the UE's split radio bearers that has a primary path set to a first cell group that includes the first serving cell comprises setting the primary path to a second cell group that does not include the first serving cell.

4. The method of claim 2, wherein performing the restoration procedure for each of the UE's split radio bearers comprises setting the primary path to the first cell group or to a further cell group.

5. The method of claim 1, wherein:
performing the recovery procedure for each of the UE's split radio bearers comprises:
storing a currently configured value for an UL data threshold parameter in a local variable, and
setting the UL data threshold parameter to a value that requires the UE to request UL grants only from a second cell group that does not include the first serving cell; and
performing the restoration procedure for each of the UE's split radio bearers comprises restoring the value stored in the local variable to the UL data threshold parameter.

6. The method of claim 1, further comprising receiving, from the MN, an indication of whether the UE should perform the recovery procedure in response to detecting the radio link problem, wherein the recovery procedure is performed selectively based on the indication.

7. The method of claim 6, wherein:
the received indication comprises respective indications corresponding to each of the UE's split radio bearers; and
the recovery procedure is performed selectively for the each of the UE's split radio bearers based on the corresponding indication.

8. The method of claim 1, further comprising sending, to the MN, an indication of the radio link problem associated with the first serving cell.

9. A user equipment (UE) configured for dual connectivity with a master node (MN) providing a master cell group that includes a primary serving cell (PCell) and with a secondary node (SN) providing a secondary cell group that includes a primary secondary cell (PSCell), the UE comprising:

radio interface circuitry configured to communicate with the MN via at least the PCell and the SN via at least the PSCell; and processing circuitry operably coupled to the radio interface circuitry, whereby the processing circuitry and the radio interface circuitry are configured to perform operations corresponding to the method of claim 1.

10. A method performed by network node configured for dual connectivity with a user equipment (UE) via a master cell group that includes a primary serving cell (PCell) or via a secondary cell group that includes a primary secondary cell (PSCell), the method comprising:
receiving, from the UE, an indication of a radio link problem associated with a first serving cell, wherein the first serving cell is the PCell or the PSCell and is part of a first cell group provided by the network node; and
in response to receiving the indication, sending, to a target network node, a handover preparation information message that includes:
a first indication of a UE handover due to a radio link problem in the first cell group, and
a second indication that the UE has performed a recovery procedure for one or more split radio bearers such that all uplink (UL) data transmission for the one or more split radio bearers occurs only via a secondary path that does not include the first serving cell.

11. The method of claim 10, wherein the second indication indicates that, for each of the UE's split radio bearers that was subject to the recovery procedure, the UE has set the primary path to a second cell group that does not include the first serving cell.

12. The method of claim 10, wherein the second indication indicates that, for each of the UE's split radio bearers that was subject to the recovery procedure, the UE has:
stored a currently configured value for an UL data threshold parameter in a local variable; and
set the UL data threshold parameter to a value that requires the UE to request UL grants only from a second cell group that does not include the first serving cell.

13. The method of claim 10, further comprising sending, to the UE, a third indication of whether the UE should perform the recovery procedure in response to detecting the radio link problem.

14. The method of claim 13, wherein the third indication comprises respective indications associated with respective split radio bearers.

15. A network node configured for dual connectivity with a user equipment (UE) via a master cell group that includes a primary serving cell (PCell) or via a secondary cell group that includes a primary secondary cell (PSCell), the network node comprising:
communication interface circuitry configured to communicate with the UE and with one or more other network nodes; and
processing circuitry operably coupled with the communication interface circuitry, whereby the processing circuitry and the communication interface circuitry are configured to perform operations corresponding to the method of claim 10.

16. A method performed by a target network node for a user equipment (UE) configured for dual connectivity via a master cell group that includes a primary serving cell (PCell) and a secondary cell group that includes a primary secondary cell (PSCell), the method comprising:
receiving, from a network node, a handover preparation information message that includes:
a first indication of a UE handover due to a radio link problem in a first cell group, provided by the network node, that includes a first serving cell, wherein the first serving cell is the PCell or the PSCell; and
a second indication that the UE has performed a recovery procedure for one or more split radio bearers such that all uplink (UL) data transmission for the one or more split radio bearers occurs only via a secondary path that does not include the first serving cell; and
in response to the second indication, performing a restoration procedure for each of the split radio bearers that was subject to the recovery procedure.

17. The method of claim 16, further comprising, in response to the first indication, performing a handover of the UE from the first serving cell to a first target cell in a target cell group provide by the target network node.

18. The method of claim 17, wherein performing the restoration procedure comprises sending, to the UE a reconfiguration message that indicates the UE should perform a restoration procedure such that UL data transmission for each of the split radio bearers occurs via both the secondary path and a primary path that includes the first target cell.

19. The method of claim 18, wherein:
the second indication indicates that, for each of the split radio bearers that was subject to the recovery procedure, the UE has set the primary path to a second cell group that does not include the first serving cell; and
the reconfiguration message indicates that, for each of the split radio bearers that was subject to the recovery procedure, the UE should set the primary path to a first target cell group that includes the first target cell.

20. The method of claim 18, wherein:
the second indication indicates that the UE has, for each of the split radio bearers that was subject to the recovery procedure:
stored a currently configured value for an UL data threshold parameter in a local variable, and
set the UL data threshold parameter to a value that requires the UE to request UL grants only from a second cell group that does not include the first serving cell; and
the reconfiguration message indicates that, for each of the split radio bearers that was subject to the recovery procedure, the UE should restore the value stored in the local variable to the UL data threshold parameter.

21. A target network node for a user equipment (UE) configured for dual connectivity via a master cell group that includes a primary serving cell (PCell) and a secondary cell group that includes a primary secondary cell (PSCell), the target network node comprising:
communication interface circuitry configured to communicate with the UE and with one or more other network nodes; and
processing circuitry operably coupled with the communication interface circuitry, whereby the processing circuitry and the communication interface circuitry are configured to perform operations corresponding to the method of claim 16.

* * * * *